United States Patent
Ashida et al.

(10) Patent No.: US 8,219,617 B2
(45) Date of Patent: Jul. 10, 2012

(54) GAME SYSTEM, GAME TERMINAL THEREFOR, AND SERVER DEVICE THEREFOR

(75) Inventors: Hiroyuki Ashida, Tokyo (JP); Shintaro Osato, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 497 days.

(21) Appl. No.: 12/374,162

(22) PCT Filed: Jul. 20, 2007

(86) PCT No.: PCT/JP2007/064365
§ 371 (c)(1),
(2), (4) Date: Jan. 16, 2009

(87) PCT Pub. No.: WO2008/013119
PCT Pub. Date: Jan. 31, 2008

(65) Prior Publication Data
US 2009/0318235 A1    Dec. 24, 2009

(30) Foreign Application Priority Data
Jul. 26, 2006  (JP) ................ 2006-203997

(51) Int. Cl.
G06F 15/16 (2006.01)
G06F 15/173 (2006.01)
G06F 9/46 (2006.01)
G06F 17/00 (2006.01)
G06F 19/00 (2011.01)

(52) U.S. Cl. ........... 709/205; 709/226; 709/229; 463/42

(58) Field of Classification Search ........... 709/205
See application file for complete search history.

(56) References Cited

U.S. PATENT DOCUMENTS

| | | | | |
|---|---|---|---|---|
| 5,838,909 A | * | 11/1998 | Roy et al. | 709/209 |
| 6,038,599 A | * | 3/2000 | Black et al. | 709/223 |
| 6,343,320 B1 | | 1/2002 | Fairchild et al. | |
| 6,697,869 B1 | | 2/2004 | Mallart et al. | 709/231 |
| 7,124,410 B2 | * | 10/2006 | Berg et al. | 718/104 |

(Continued)

FOREIGN PATENT DOCUMENTS

EP    0 988 878 A2    3/2000
(Continued)

OTHER PUBLICATIONS

Saha, Debanjan et al. "A Service Platform for On-Line Games," Proceedigns of the 2nd Workshop on Network and System Support for Games, May 2003, pp. 180-184.*

(Continued)

Primary Examiner — Lynn Feild
Assistant Examiner — Melvin H Pollack
(74) Attorney, Agent, or Firm — Sughrue Mion, PLLC

(57) ABSTRACT

The present invention provides a game system 100, a game terminal 10, and a server device 40. Game system 100 allows players to play a game in a unit of a group constituting one game terminal 10 that has been selected as a parent node and game terminals 10 that have been selected as child nodes. The parent node is capable of communicating with each node, and each child node is capable of communicating with the parent node. The selection of the parent node is performed by server device 40. A parent node is selected based on bandwidth notified from each game terminal 10.

11 Claims, 16 Drawing Sheets

U.S. PATENT DOCUMENTS

| | | | |
|---|---|---|---|
| 7,543,052 B1 * | 6/2009 | Cesa Klein | 709/224 |
| 7,602,808 B2 * | 10/2009 | Ullmann et al. | 370/468 |
| 7,610,330 B1 * | 10/2009 | Quinn et al. | 709/201 |
| 7,702,723 B2 * | 4/2010 | Dyl | 709/203 |
| 7,729,286 B2 * | 6/2010 | Mishra | 370/254 |
| 7,860,993 B2 * | 12/2010 | Chintala et al. | 709/231 |
| 7,907,598 B2 * | 3/2011 | Anisimov et al. | 370/352 |
| 7,925,756 B1 * | 4/2011 | Riddle | 709/226 |
| 7,941,482 B2 * | 5/2011 | Bates et al. | 709/203 |
| 7,941,804 B1 * | 5/2011 | Herington et al. | 718/104 |
| 2001/0044339 A1 * | 11/2001 | Cordero et al. | 463/42 |
| 2002/0018477 A1 * | 2/2002 | Katz | 370/401 |
| 2004/0139158 A1 | 7/2004 | Datta | 709/205 |
| 2006/0020700 A1 * | 1/2006 | Qiu et al. | 709/224 |
| 2006/0190654 A1 * | 8/2006 | Joy et al. | 710/305 |
| 2006/0205509 A1 | 9/2006 | Hirota | 463/40 |
| 2007/0294410 A1 * | 12/2007 | Pandya et al. | 709/226 |
| 2009/0271512 A1 * | 10/2009 | Jorgensen | 709/224 |
| 2010/0296511 A1 * | 11/2010 | Prodan et al. | 370/389 |
| 2011/0016224 A1 * | 1/2011 | Riley | 709/232 |
| 2011/0116461 A1 * | 5/2011 | Holt et al. | 370/329 |

FOREIGN PATENT DOCUMENTS

| | | | |
|---|---|---|---|
| EP | 988878 A2 * | 3/2000 | |
| EP | 1 066 867 A2 | 1/2001 | |
| EP | 1683557 A1 | 7/2006 | |
| JP | 2000-296273 A | 10/2000 | |
| JP | 2005137812 A | 2/2005 | |
| JP | 2005-137812 A | 6/2005 | |
| JP | 2005137812 A * | 6/2005 | |
| JP | 2006-055312 A | 3/2006 | |
| TW | 480857 | 3/2002 | |
| TW | 200614040 | 5/2006 | |
| WO | WO 97/47091 | 12/1997 | |
| WO | WO 00/10663 | 3/2000 | |
| WO | 01/57678 A1 | 9/2001 | |
| WO | WO 2006/044565 A2 | 4/2006 | |

OTHER PUBLICATIONS

Kim, Jaecheol et al. "Traffic Characteristics of a Massively Multi-Player Online Role Playing Game," Proceedings of the 4th ACM SIGCOMM Workshop on Network and System Support for Games, Oct. 2005, pp. 1-8.*

Yaiche, Haikel et al. "A Game Theoretic Framework for Bandwidth Allocation and Pricing in Broadband Networks," IEEE/ACM Transactions on Networking, vol. 8, No. 5, Oct. 2000, pp. 667-678.*

Sheldon, Nathan et al. "The Effect of Latency on User Performance in Warcraft III," Proceedings of the 2nd Workshop on Network and System Support for Games, May 2003, pp. 3-14.*

Wright, S. and Tischer, S. "Architectural Considerations in Online Game Services over DSL Networks," IEEE International Conference on Communications, vol. 3, Jun. 2004, pp. 20-24.*

Bosser, Anne-Gwenn. "Massively Multi-Player Games: Matching Game Design with Technical Design," Proceedings of the 2004 ACM SIGCHI International Conference on Advances in Computer Entertainment Technology, Jun. 2004, pp. 263-268.*

Supplementary European Search Report and Opinion of Application No. 07791097.4, dated Jan. 4, 2010.

Taiwanese Examination Opinion and Search Report for Application No. 096126959 dated Apr. 23, 2010 (English Translation is attached.).

Supplementary European Search Report and Opinion of Application No. 07791102.2, dated Mar. 10, 2010.

International Search Report of Application No. PCT/JP2007/064365, dated Oct. 9, 2007.

* cited by examiner

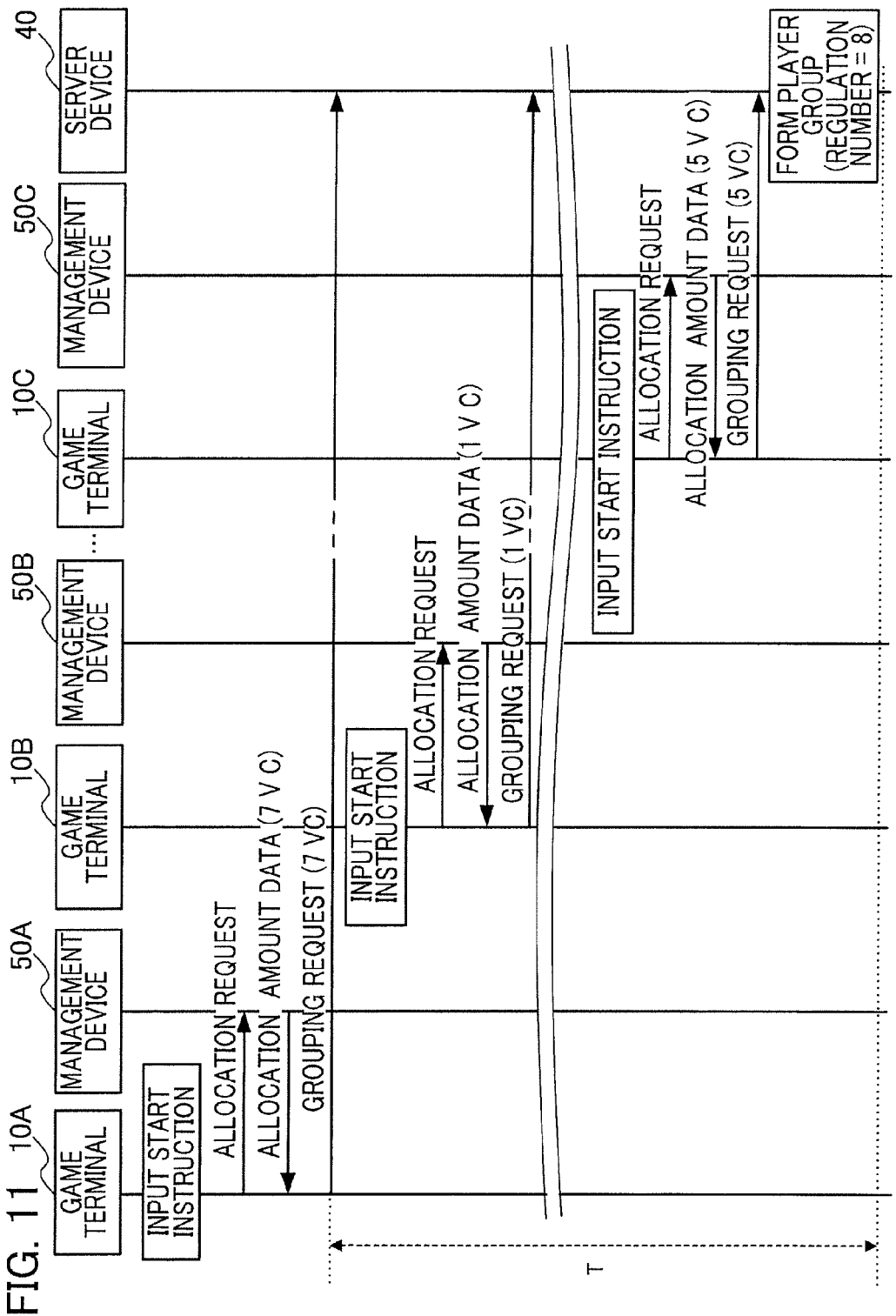

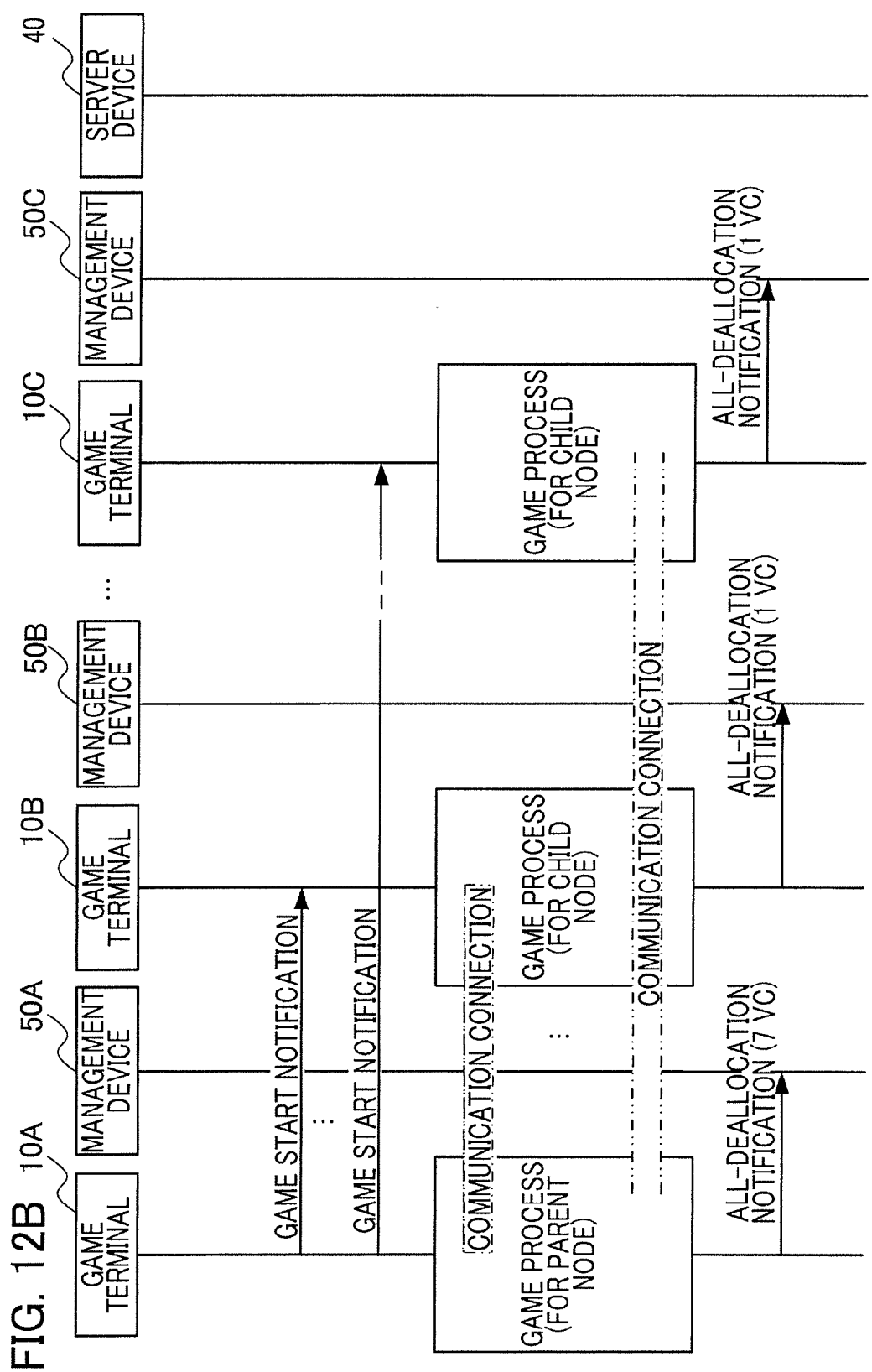

FIG. 13

| COMMUNICATION ADDRESS | SECURED AMOUNT |
|---|---|
| COMMUNICATION ADDRESS OF GAME TERMINAL 10A | 7 VC |

| COMMUNICATION ADDRESS | SECURED AMOUNT |
|---|---|
| COMMUNICATION ADDRESS OF GAME TERMINAL 10A | 7 VC |
| COMMUNICATION ADDRESS OF GAME TERMINAL 10B | 1 VC |

| COMMUNICATION ADDRESS | SECURED AMOUNT |
|---|---|
| COMMUNICATION ADDRESS OF GAME TERMINAL 10A | 7 VC |
| COMMUNICATION ADDRESS OF GAME TERMINAL 10B | 1 VC |
| ⁓ | ⁓ |
| COMMUNICATION ADDRESS OF GAME TERMINAL 10C | 5 VC |

441

GAME SYSTEM, GAME TERMINAL THEREFOR, AND SERVER DEVICE THEREFOR

Cross-Reference to Prior Applications

This application is a filing under 35 U.S.C. §371 of International Application No. PCT/JP2007/064365, filed on Jul. 20, 2007, which claims priority to Japanese Application No. 2006-203997, filed Jul. 26, 2006, the disclosure of each of which is incorporated herein by express reference thereto.

TECHNICAL FIELD

The present invention relates to a game system, to a game terminal, and to a server device.

BACKGROUND ART

There is a widely used game system that allows three or more players to play one game via a network. A type of this game system advances a game as a unit for a group including a server, or alternatively, one game terminal is selected as a parent node (a server or a master node) and game terminals are selected as child nodes (clients or slave nodes). The number of child nodes is variable for each group within a range that has an upper limit and a lower limit, i.e., the number of child nodes can differ among different groups.

In such a game system, a communication group including plural game terminals is usually provided in each venue, and a group of game terminals (a player group) that will be used by players is formed across plural venues. Communication between game terminals is performed via a communication path allocated to each communication group (venue). A communication path is shared by game terminals belonging to a communication group that corresponds to the communication path. In this game system, a certain amount of the bandwidth corresponding to the upper limit of the range will be secured for a parent node if the remainder of the bandwidth in a communication path is sufficient while a game is proceeding.

Japanese Patent Application Laid-Open Publication No. 2005-137812 proposes a technique in which, in a game system having a fixed number of child nodes, communication failures can be minimized even in a case in which the bandwidth of each communication path is smaller than the maximum amount of bandwidth required for each communication path. Also, in this technique, while a game is being played, a certain amount of the bandwidth will be continuously secured if the remaining amount of bandwidth of a communication path is sufficient.

However, the amount of bandwidth required for a parent node while a game is being played depends on the number of child nodes in a game system in which the number of child nodes is variable. Therefore, in the conventional technique, a bandwidth in an amount that is greater than the bandwidth required by a parent node is sometimes continuously secured. In other words, in the conventional technique, extra bandwidth that will never be used is sometimes continuously secured for a parent node for a long period of time. This is one of the factors that degrade the use efficiency of the bandwidth.

DISCLOSURE OF INVENTION

The present invention has as objects to provide a game system that enhances the use efficiency of bandwidth in a communication path in an environment in which the number of child nodes is variable.

In the following, description will be given of the present invention. It should be noted that reference numerals in the attached drawings are shown in parentheses to facilitate understanding of the present invention; however, this is not intended to limit the present invention to the embodiments as shown in the drawings.

In one aspect, the present invention provides a game system (100) having plural communication groups (5A, 5B, 5C, ...), each having been allocated different communication paths from one another and each including plural game terminals (10) sharing the communication path allocated to the respective communication groups (5A, 5B, 5C, ...) and a server device (40) that forms a player group of game terminals (10) that will play a multiple-player game in a unit of a group by selecting, from among the plural game terminals (10) of the plural communication groups (5A, 5B, 5C, ...), one game terminal (10) as a parent node and a game terminal (10) other than the one game terminal (10) as a child node. In this game system, the child node communicates with the parent node exclusively using a certain amount of bandwidth, and the number of the child nodes varies for different groups within a range having an upper limit and a lower limit, and each of the plural game terminals (10) of the plural communication groups (5A, 5B, 5C, ...) has: an inputter (14) that receives an instruction input by a player; a securer (11) that secures, upon a predetermined instruction being input via the inputter (14), bandwidth that is equal to or greater than the certain amount of bandwidth and is equal to or less than remaining amount of the bandwidth of a communication path used for the game terminal (10); a grouping request transmitter (11, 17) that transmits a grouping request for requesting formation of the player group to the server device (40), the grouping request also indicating the bandwidth secured by the securer (11); a player group data receiver (11, 17) that receives player group data indicating the configuration of the player group; a controller (11) that controls, on the basis of the player group data, communication during the game based on a result of the determination; a deallocation bandwidth identifier (11) that identifies, as bandwidth to be deallocated, the difference between the bandwidth secured by the securer (11) and bandwidth that will be required at the game terminal (10) in the player group having a configuration indicated by the player group data; and a deallocator (11, 17) that deallocates the bandwidth to be deallocated, and the server device (40) has a grouping request receiver (41, 42) that receives the grouping request; a secured amount storage (44) that stores a piece of secured amount data indicating the bandwidth indicated by the grouping request in association with a game terminal (10) that has transmitted the grouping request; a grouper (41) that forms the player group based on the piece of secured amount data stored in the secured amount storage (44); and a player group data transmitter (41, 42) that transmits, to each of the game terminals (10) configuring the player group formed through the selection by the selector, the player group data of the player group, and the grouper (41) compares bandwidth indicated by the pieces of secured amount data for game terminals (10) of the number that is greater than the number of child nodes of the group from among game terminals (10) corresponding to the pieces of secured amount data stored in the secured amount storage (44), to form the group based on a result of the comparison. The upper limit and the lower limit are natural numbers, and the upper limit is greater than the lower limit. The minimum lower limit is one, and the minimum upper limit is two.

In this game system, at a game terminal that is selected either as a parent node or a child node, bandwidth corresponding to bandwidth secured for the game terminal and the bandwidth required for the game terminal during the game is deallocated. Therefore, according to the game system, a parent node does not secure excess bandwidth that will not be used during the game for a long period, and therefore, the efficiency in use of bandwidth in a communication path is enhanced in an environment in which the number of child nodes is variable.

There are various ways for achieving the securing and deallocating of bandwidth. For example, each game terminal may be caused to store the remaining amount of bandwidth of a communication path used for the game terminal so that, when the remaining amount is updated at a game terminal, the remaining amount at another game terminal in the same communication group is updated accordingly. For another example, the game system may be provided with plural management devices (50) that are provided for the respective communication groups and are capable of communicating respectively with the plural game terminals (10) of the communication group to which each management device corresponds, and the securer (11) may have an allocation requester that transmits an allocation request requesting allocation of bandwidth to the management device (50) corresponding to the communication group including the game terminal (10) and an allocation data receiver (11, 17) that receives an allocation amount data indicating bandwidth allocated to the game terminal (10), and the securer may secure bandwidth based on the allocation amount data; and the deallocator (11, 17) may have a deallocation notification transmitter (11, 17) that transmits a deallocation notification indicating the bandwidth to be deallocated to the management device (50) corresponding to the communication group including the game terminal (10), and each of the plural management devices (50) may have a remaining amount storage (54) that stores remaining amount data indicating remaining amount of bandwidth in the communication path allocated to the corresponding communication group; an allocation request receiver (51, 52) that receives the allocation request; an allocation processor (51, 52, 54) that, upon receiving the allocation request by the allocation request receiver (51, 52), determines, based on the remaining data, bandwidth to be allocated to a game terminal (10) that has transmitted the allocation request, transmits the allocation amount data indicating the determined bandwidth to the game terminal (10) that has transmitted the allocation request, and updates the remaining amount data so that the remaining amount is reduced by the amount of bandwidth; a deallocation notification receiver (51, 52) that receives the deallocation notification; and a deallocation processor (51, 52, 54) that, upon receiving the deallocation notification by the deallocation notification receiver (51, 52), updates the remaining amount data so that the remaining amount is reduced by the amount of bandwidth indicated by the deallocation notification. This embodiment includes an embodiment in which a game terminal concurrently serves as a management device. Examples of such an embodiment would be one in which a predetermined one of plural game terminals of each communication group functions as a management device for this communication group or one in which a freely selected one of plural game terminals of each communication group functions as a management device for this communication group. In the latter case, each game terminal will have to identify a game terminal that is serving as a management device corresponding to a communication group including the game terminal before transmitting an allocation request.

In a mode in which a game terminal concurrently serves as a management device, the game terminal concurrently serving as a management device would include a virtual entity provided with the functions of a game terminal and a virtual entity provided with the functions of a management device. A process can be shown as an example of a virtual entity. In a case in which the virtual entity is a process, the communication between a management device and a game terminal concurrently functioning as a management device will be termed "InterProcess Communication."

In the above game system, the grouper (41) may select as a parent node one game terminal (10) corresponding to the piece of secured amount data indicating bandwidth that is found to be the greatest by the comparison. In this embodiment, a player group with a greater number of child nodes is formed with higher priority. This is a characteristic suitable for a game in which having a greater number of child nodes is preferable. Also, in this embodiment, a game terminal having the largest remaining amount of bandwidth in a communication path it uses is selected as a parent node. This is a useful characteristic in view of leveling the remaining amount of bandwidth in the communication path.

Furthermore, the grouper (41) may select as a parent node one game terminal (10) corresponding to the piece of secured amount data indicating bandwidth that is found to be the smallest by the comparison. According to this embodiment, a player group with a lower number of child nodes is formed with higher priority. This is a characteristic suitable for a game in which having a lower number of child nodes is preferable. Also, in this embodiment, a game terminal having the least remaining amount of bandwidth in a communication path it uses is selected as a parent node. This is a useful characteristic in view of increasing the number of communication paths with no remaining bandwidth In the above game system, a game terminal may secure bandwidth of an amount that is the same as the remaining amount of bandwidth in a communication path used for the game terminal and deallocates excess bandwidth after a player group is formed. However, in view of the efficient use of bandwidth, it is preferable that a game terminal avoid securing bandwidth that will certainly be excessive from the beginning or promptly deallocates, in the secured bandwidth, bandwidth that will certainly become excessive.

For example, the securer (11) may secure bandwidth corresponding to the upper limit in a case in which the remaining amount of bandwidth of a communication path used by the game terminal (10) is greater than the bandwidth corresponding to the upper limit. In this case, excess bandwidth that exceeds the amount corresponding to the upper limit of the range in the number of child nodes (bandwidth that will certainly be excessive) is not secured at all from the beginning. In another example, when the lower limit is two or greater; and the securer (11) may secure the certain amount of bandwidth in a case in which the remaining amount of bandwidth of a communication path used by the game terminal (10) is less than the bandwidth corresponding to the certain amount of bandwidth. In this case, bandwidth that exceeds the certain amount of bandwidth but is less than the lower limit (bandwidth that will certainly be excessive) is not secured at all from the beginning. These modes are advantageous in view of efficient use of bandwidth, and also in that the amount of communication performed for deallocating bandwidth that will certainly be excessive can be reduced.

Therefore, this embodiment has advantages not only in view of the efficient use of bandwidth but also in that the amount of communication for deallocating bandwidth that will certainly be excessive can be reduced.

Furthermore, for example, the server device (40) may further have a first returner (41, 42) that determines, upon receiving the grouping request, whether bandwidth indicated by the grouping request is greater than bandwidth corresponding to the upper limit and that, if a result of the determination is affirmative, transmits first return data indicating bandwidth of the difference therebetween to the game terminal (10) that has transmitted the grouping request and regards the piece of secured amount data stored by the secured amount storage (44) in association with the game terminal (10) as indicating bandwidth corresponding to the upper limit, and each of the plural game terminals (10) of the plural communications groups (5A, 5B, 5C, . . . ) may further have: a first return data receiver (11, 17) that receives the first return data; and a first deallocation identifier (11) that, upon receiving the first return data, identifies bandwidth indicated by the first return data as the bandwidth to be deallocated, and the deallocator (11, 17) may deallocate bandwidth to be deallocated when the bandwidth to be deallocated is identified. In this embodiment, excess bandwidth that exceeds bandwidth corresponding to the upper limit (bandwidth that will certainly be excessive) is deallocated before a player group is formed. For another example, the server device (40) may further have a second returner (41, 42) that determines, upon receiving the grouping request, whether bandwidth indicated by the grouping request is less than bandwidth corresponding to the lower limit and is greater than the certain amount bandwidth and that, if a result of the determination is affirmative, transmits second return data indicating bandwidth of the difference between the bandwidth indicated by the grouping request and the certain amount of bandwidth to the game terminal (10) that has transmitted the grouping request and regards the piece of secured amount data stored by the secured amount storage (44) in association with the game terminal (10) as indicating the certain amount of bandwidth, and each of the plural game terminals (10) of the plural communications groups (5A, 5B, 5C, . . . ) may further have: a second return data receiver (1, 17) that receives the second return data; and a second deallocation identifier (11) that, upon receiving the second return data, identifies bandwidth indicated by the second return data as the bandwidth to be deallocated, and the deallocator (11, 17) may deallocate bandwidth to be deallocated when the bandwidth to be deallocated is identified. In this embodiment, bandwidth that exceeds bandwidth by the certain amount of bandwidth but is under the lower limit (bandwidth that will certainly be excessive) is deallocated before a player group is formed. These embodiments have advantages in view of efficient use of bandwidth.

For example, in a case in which a management device is provided, the securer (1) may, upon receiving the allocation amount data, determine whether bandwidth indicated by the allocation amount data is greater than bandwidth corresponding to the upper limit, and if the result of the determination is affirmative, identify bandwidth therebetween as the bandwidth to be deallocated and secure bandwidth corresponding to the upper limit. In this case, excess bandwidth that exceeds bandwidth corresponding to the upper limit (bandwidth that will certainly be excessive) is deallocated before a grouping request is transmitted from a game terminal to a server device. Also, for example, in a case in which a management device is provided, the securer (11) may, upon receiving the allocation amount data, determine whether bandwidth indicated by the allocation amount data is less than bandwidth corresponding to the lower limit and is greater than the certain amount of bandwidth, and if the result of the determination is affirmative, identify bandwidth between the bandwidth indicated by the allocation amount data and the certain amount of bandwidth as the bandwidth to be deallocated and secure the certain amount of bandwidth. In this embodiment, bandwidth that exceeds the bandwidth of the certain amount of bandwidth, but is below the lower limit (bandwidth that will certainly be excessive) is deallocated before a grouping request is transmitted from a game terminal to a server device. These embodiments have advantages not only in view of efficient use of bandwidth, but also in that the amount of communication for deallocating bandwidth that will certainly be excessive can be reduced.

In the above game system, the number of child nodes may be restricted in terms of its range, but further restriction depending on receiving situations of grouping requests may be added in view of preventing a player from becoming hesitant in playing the game. For example, the grouper (41) may restrict the number of child nodes to the upper limit in a case in which a certain time period has not passed since a first receipt of a grouping request that triggered storage, in the secured amount storage (44), of the piece of secured amount data stored in the secured amount storage (44) in association with a game terminal (10) that is not yet in the player group, whereas the grouper may freely select the number of child nodes within the range if the certain time period has passed. According to this embodiment, during a period in which there is lower probability of a player becoming hesitant, it is not allowed to form a player group that does not have the maximum number of child nodes, whereas during a period in which there is a higher probability of a player becoming hesitant, it is allowed to form a player group that does not have the maximum number of child nodes.

Furthermore, the present invention provides a game terminal (10) for use in a game system (100) having a server device, the game terminal having a communicator that communicates with the server device (40) that forms a player group of game terminals that will play a multiple-player game in a unit of a group by selecting, from among plural game terminals (10) of plural communication groups (5A, 5B, 5C, . . . ), one game terminal (10) as a parent node and a game terminal (10) other than the one game terminal (10) as a child node, the child node may communicate with the parent node by exclusively using a certain amount of bandwidth; the number of child nodes may be variable for the respective player groups within a range having an upper limit and a lower limit, and the upper limit may be two or greater; and the plural communication groups (5A, 5B, 5C, . . . ) may be respectively allocated with different communications paths and each communication group includes plural game terminals that share the allocated communication path, and the game terminal (10) may have an inputter (14) that receives an instruction input by a player; a securer (11) that secures, upon a predetermined instruction being input via the inputter (14), bandwidth that is equal to or greater than the certain amount of bandwidth and is equal to or less than the remaining amount of the bandwidth of a communication path used for the game terminal; a grouping request transmitter (11, 17) that transmits a grouping request for requesting formation of the player group to the server device (40), the grouping request also indicating the bandwidth secured by the securer (11); a player group data receiver (11, 17) that receives player group data indicating the configuration of the player group; a controller (11) that controls, on the basis of the player group data, communication during the game based on a result of the determination; and a deallocation bandwidth identifier (11) that identifies, as bandwidth to be deallocated, the difference between the bandwidth secured by the securer (11) and bandwidth that will be required at the game terminal in the player group having a configuration indicated by the player group data; and a deallocator (11, 17) that deallocates the bandwidth to be deallocated, and the server device (40) may have a grouping request receiver (41, 42) that receives the grouping request; a secured amount storage (44) that stores a piece of secured amount data indicating the bandwidth indicated by the grouping request in association with a game terminal (10) that has transmitted the grouping request; a grouper (41) that forms the player group based on the piece of secured amount data stored in the secured amount storage (44); and a player group data transmitter (41, 42) that transmits, to each of the game terminals (10) configuring the player group grouped through the selection by the selector, the player group data of the player group, and the grouper (41) may compare bandwidth indicated by the pieces of secured amount data for game terminals (10) of the number that is greater than the number of child nodes of the group from among game terminals (10) corresponding to the pieces of secured amount of data stored in the secured amount storage (44), to form the group based on a result of the comparison.

According to this game terminal, the above game system can be configured. Therefore, according to this game terminal, the use efficiency of bandwidth in a communication path in an environment in which the number of child nodes is variable can be enhanced.

The present invention further provides a server device (40) for use in a game system (100) having plural communication groups (5A, 5B, 5C, . . . ) each including plural game terminals (10), and the server device (40) may have a communicator that communicates with each of the plural game terminals (10) of the plural communication groups; and a grouper (41) that forms a player group of game terminals (10) that will play a multiple-player game in a unit of a group by selecting, from among plural game terminals (10) of plural communication groups (5A, 5B, 5C, . . . ), one game terminal (10) as a parent node and a game terminal other than the one game terminal (10) as a child node, and the number of child nodes may be variable for the respective player groups within a range having an upper limit and a lower limit and the upper limit may be two or greater; and the plural communication groups (5A, 5B, 5C, . . . ) may be respectively allocated with different communications paths and each communication group includes plural game terminals (10) that share the allocated communication path; and each of the plural game terminals (10) of the plural communication groups (5A, 5B, 5C, . . . ) may have an inputter (14) that receives an instruction input by a player; a securer (11) that secures, upon a predetermined instruction being input via the inputter (14), bandwidth that is equal to or greater than a certain amount of bandwidth and is equal to or less than the remaining amount of the bandwidth of a communication path used for the game terminal (10); a grouping request transmitter (11, 17) that transmits a grouping request for requesting formation of the player group to the server device (40), the grouping request also indicating the bandwidth secured by the securer (11); a player group data receiver (11, 17) that receives player group data indicating the configuration of the player group; a controller (11) that controls, on the basis of the player group data, communication during the game based on a result of the determination; a deallocation bandwidth identifier (11) that identifies, as bandwidth to be deallocated, the difference between the bandwidth secured by the securer (11) and bandwidth that will be required at the game terminal (10) in the player group having a configuration indicated by the player group data; and a deallocator (11, 17) that deallocates the bandwidth to be deallocated, and the server device may further have: a grouping request receiver (41, 42) that receives the grouping request; a secured amount storage (44) that stores a piece of secured amount data indicating the bandwidth indicated by the grouping request in association with a game terminal (10) that has transmitted the grouping request; and a player group data transmitter (41, 42) that transmits, to each of the game terminals (10) configuring the player group formed through the selection by the selector, the player group data of the player group, and the grouper (41) may compare bandwidth indicated by the pieces of secured amount data for game terminals (10) of the number that is greater than the number of child nodes of the group from among game terminals (10) corresponding to the pieces of secured amount data stored in the secured amount storage (44), to form the group based on a result of the comparison.

According to this server device, the above game system can be configured. Therefore, according to this server device, the use efficiency of bandwidth in a communication path in an environment in which the number of child nodes is variable can be enhanced.

EFFECTS OF THE INVENTION

According to the invention, the use efficiency of bandwidth of a communication path can be enhanced in an environment in which the number of child nodes is variable.

BRIEF DESCRIPTION OF DRAWINGS

FIG. 11 is a sequence diagram showing a first operational example of game system 100.

FIG. 12B is a sequence diagram showing the first operational example of game system 100.

FIG. 13 is a diagram showing an example of details of entry list 441.

FIG. 14 is a diagram showing an example of details of entry list 441.

FIG. 15 is a diagram showing an example of details of entry list 441.

BEST MODE FOR CARRYING OUT THE INVENTION

In the following, description will be given of a preferred embodiment of the present invention with reference to the drawings. A specific configuration described in the following is merely an example, and the present invention encompasses, in its scope, various embodiments obtained by modifying the specific configuration.

Figure 1:
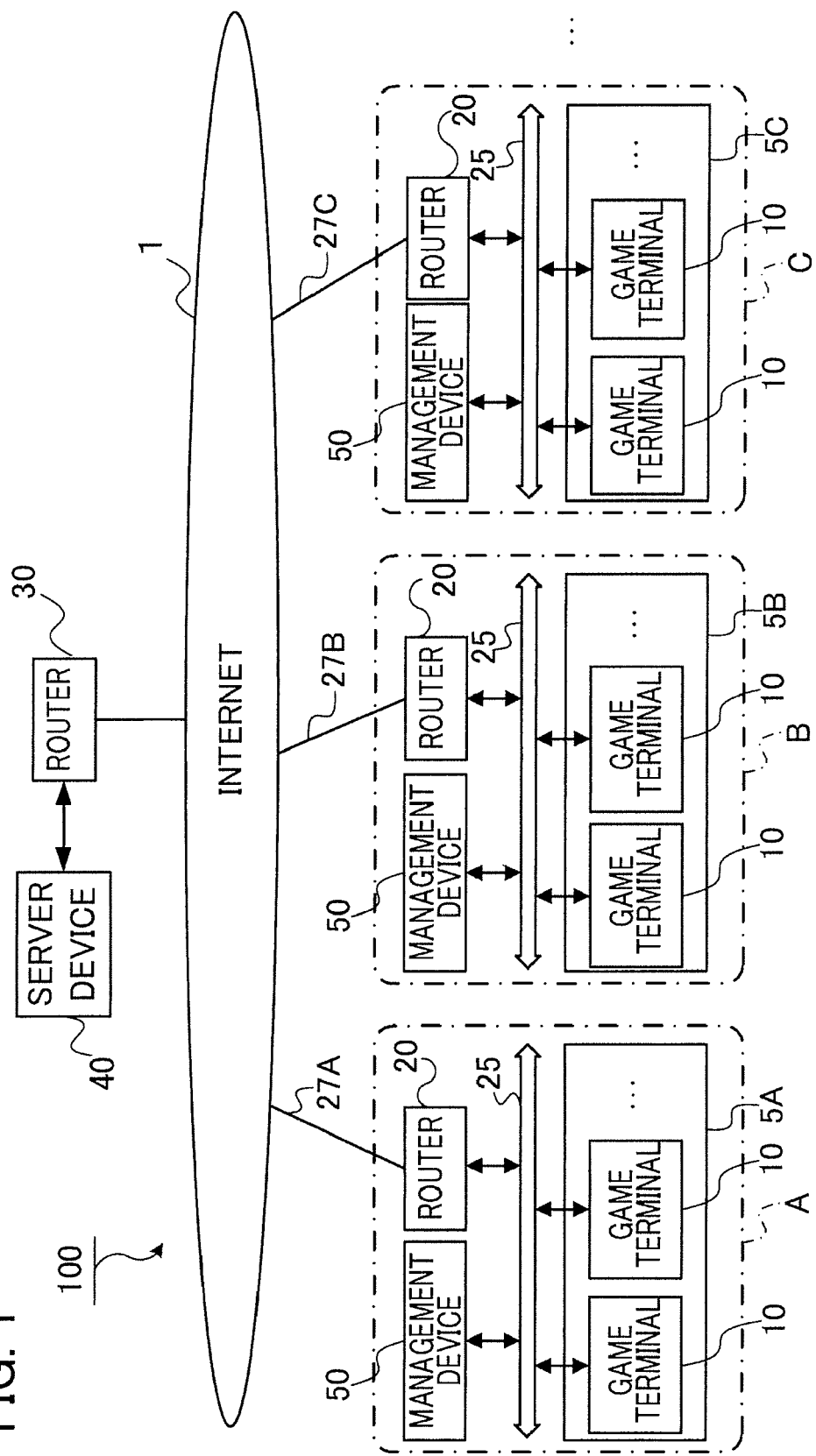
FIG. 1 is a block diagram showing an overall configuration of a game system 100 according to an embodiment of the present invention.

Game System:

FIG. 1 is a block diagram showing an overall configuration of game system 100 according to an embodiment of the present invention. Game system 100 is a system in which players are able to play a predetermined game in a unit of a group consisting of communication nodes of the regulation number. The regulation number is variable for each group in a range having an upper limit and a lower limit. The upper limit of the range is eight; and the lower limit is six.

The predetermined game is a multiplayer-type network game, and the execution of the game essentially involves communication between communication nodes constituting a group (hereinafter referred to as a "player group") of game terminals that will be the players playing the game. The playworthiness or gameworthiness of the predetermined game is highest when the regulation number is eight and is lowest when the regulation number is six. In other words, as the number of players participating in the game increases, the uncertainty in the game increases. As a result, tension and thrills in the game increase. In this regard, in the present embodiment, forming a player group with the regulation number of seven takes precedence over forming a player group with the regulation number of six; and forming a player group with the regulation number of eight takes precedence over forming a player group with the regulation number of seven.

A part of game system 100 is sited at a venue (facility) A, B, C, . . . where players who have visited the site can play the predetermined game. Specifically, each venue is provided with a LAN (Local Area Network) 25, four game terminals 10 connected to LAN 25, and so as to allow players to play the predetermined game, a router 20 connecting LAN 25 to an Internet 1, and a management device 50 connected to LAN 25. Furthermore, game system 100 is provided with a server device (matching server device) 40 that forms the player group by selecting game terminals 10 of the regulation number as communication nodes and a router 30 connecting server device 40 and the Internet 1.

At each venue, four game terminals 10 constitute a communication group. For example, at the venue A, there is a communication group 5A including four game terminals in the venue A. Each communication group is managed by a management device 50 at a venue where the communication group is provided. The communication between the Internet 1 and each venue is performed via a communication path corresponding to the venue. The communication path corresponding to the venue is a communication path between router 20 of the venue and the Internet 1 and is allocated to a communication group in the venue. For example, a communication path 27A corresponding to the venue A is allocated to the communication group 5A. A communication path allocated to each communication group is shared by four game terminals 10 included in each communication group. In other words, the communication path allocated to each communication group corresponds to the four game terminals 10 included in the communication group, and the bandwidth of the communication path is monitored by management device 50 that manages this communication group. Game terminal 10 at each venue is capable of communicating with another device sited in the same venue via LAN 25 and is also capable of communicating with server device 40 and game terminals of another venue via LAN 25, router 20, the communication path corresponding to the venue, and the Internet 1.

Description will now be given of the "player group". From among communication nodes of the regulation number included in a player group, one is a parent node, and the others are child nodes, which communicate only with the parent node. In actuality, server device 40 forms a player group by selecting one game terminal 10 as a parent node and plural game terminals 10 as child nodes. The number of child nodes included in one player group agrees with the number obtained by subtracting one from the regulation number. As is obvious from the foregoing, the number of child nodes is variable for each player group within a range having an upper limit and a lower limit, with the upper limit being seven and the lower limit being five. Each game terminal 10 is capable of transmitting a grouping request for requesting the formation of a player group, and a parent node and child nodes are selected from game terminals 10 that have transmitted grouping requests.

A communication connection is used for communication between game terminals 10 when the predetermined game is being played, i.e., when there is communication between a parent node and a child node. The communication connection is a virtual communication path that connects a parent node and a child node through a communication path corresponding to a communication group including the parent node and a communication path corresponding to a communication group including the child node. Furthermore, the bandwidth of a communication connection is fixed regardless of the number of child nodes. Therefore, establishing a communication connection connecting two communication nodes requires the game system to secure a certain amount of bandwidth (VC), for each of the two communication nodes, among the available bandwidth of a communication path corresponding to each communication node. Allocation, to each game terminal 10, of the bandwidth that has been allocated to a communication path of each communication group is managed by management device 50 corresponding to each communication group. In the following description, the certain amount of bandwidth (VC) will be regarded as a unit of bandwidth, and the bandwidth of one communication connection will be expressed as "1 VC". Accordingly, a parent node is required to secure the bandwidth of 7 VC when the regulation number is eight, the bandwidth of 6 VC when the regulation number is seven, and the bandwidth of 5 VC when the regulation number is six. Therefore, the bandwidth to be secured by a parent node is one of 5 VC, 6 VC, and 7 VC. It is to be noted that the bandwidth of each communication path is 14 VC.

A grouping request transmitted by game terminal 10 indicates the bandwidth secured for this game terminal 10 (hereinafter referred to as "secured amount") and includes a piece of secured amount data indicating the secured amount. Server device 40 selects a parent node from among game terminals 10 having transmitted grouping requests that includes the secured amount data of a value that is equal to or greater than 5 VC.

The playworthiness or gameworthiness of the predetermined game is highest when the regulation number is eight and is lowest when the regulation number is six. Therefore, forming a player group with the regulation number of seven should take precedence over forming a player group with the regulation number of six; and forming a player group with the regulation number of eight should take precedence over forming a player group with the regulation number of seven. However, if it takes too long to form a player group, a player who intends to play the predetermined game is caused to wait for a long time and might become hesitant to play the game. Therefore, in the present embodiment, it is attempted to form a player group with the regulation number of eight during a period in which there is no game terminal 10 that has reached a predetermined wait time since the transmission of a grouping request, and otherwise, it is attempted to form a player group with the regulation number of eight to six.

Figure 2:
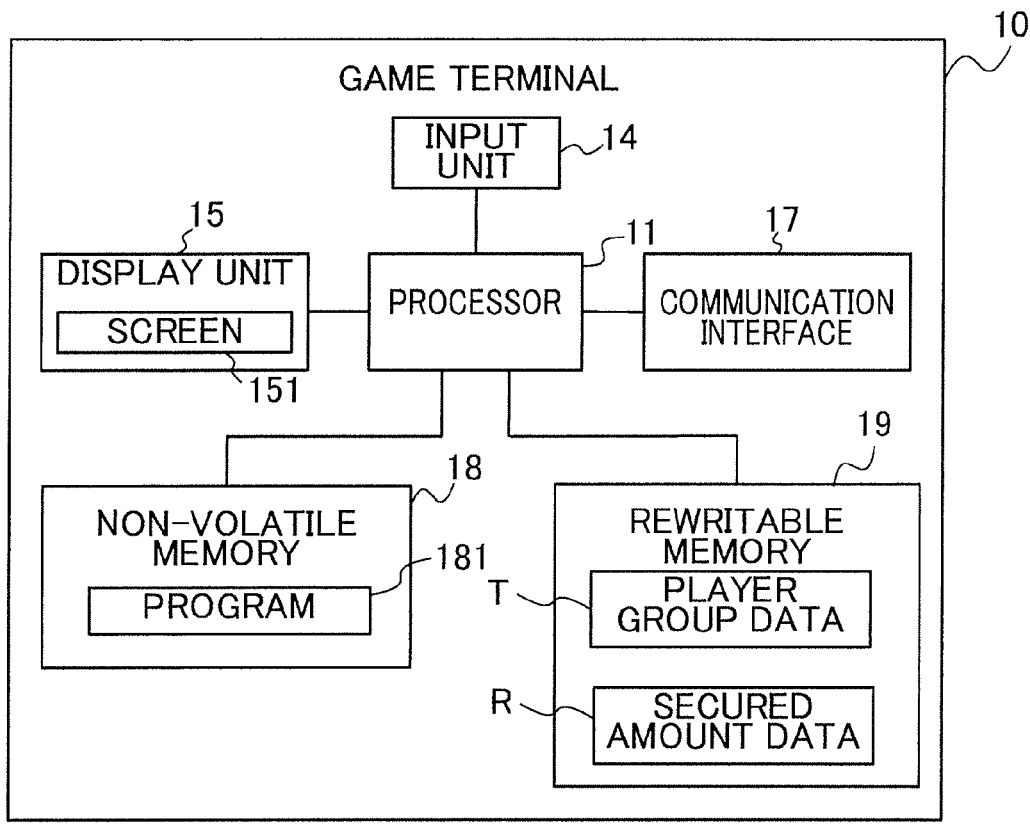
FIG. 2 is a block diagram showing a configuration of a game terminal 10 of game system 100.

Game Terminal:

FIG. 2 is a block diagram showing a configuration of game terminal 10. As shown in the figure, game terminal 10 has a processor 11, an input unit 14, a display unit 15, a communication interface 17, a non-volatile memory 18, and a rewritable memory 19. Processor 11 is, for example, at least one CPU (Central Processing Unit).

Input unit 14 is provided with plural operators, and when the operators are operated, supplies to processor 11 an operation signal corresponding to the operation. The plural operators include a start operator for inputting a start instruction (predetermined instruction) instructing the start of the predetermined game and other operators specific to the content of the predetermined game. For example, in a case in which the predetermined game is a game in which a player answers quiz questions, an operator for answering quiz questions is an operator specific to the content of the predetermined game.

Display unit 15 has a screen 151 and displays, when image data is supplied from processor 11, an image representing the image data on screen 151. A monitor or a video projector can be used as display unit 15. In a case in which a video projector is used, a screen on which an image is to be projected is screen 151. Communication interface 17 transmits and receives signals to and from LAN 25 and relays data from processor 11 and LAN 25 and vice versa. Processor 11 transmits and receives data to and from another device by using communication interface 17.

Non-volatile memory 18 is, for example, a ROM (Read Only Memory) or EEPROM (Electronically Erasable and Programmable ROM) and stores a program 181. Program 181, by being executed by processor 11, causes game terminal 10 to perform various processes such as a main process, which will be described later. Non-volatile memory 18 stores communication addresses of server device 40 and management device 50.

Rewritable memory 19 is, for example, a RAM (Random Access Memory) and stores player group data T showing a configuration of a player group to which this game terminal 10 belongs and secured amount data R indicating the secured amount of this game terminal 10, i.e., the amount of bandwidth secured for this game terminal 10. The data configuration of player group data T is freely selected, and for example, can be a configuration in which, for each of game terminals 10 of the regulation number constituting a player group, data showing a communication address of game terminal 10 is associated with a flag showing whether game terminal 10 has been selected as a parent node.

Figure 3:
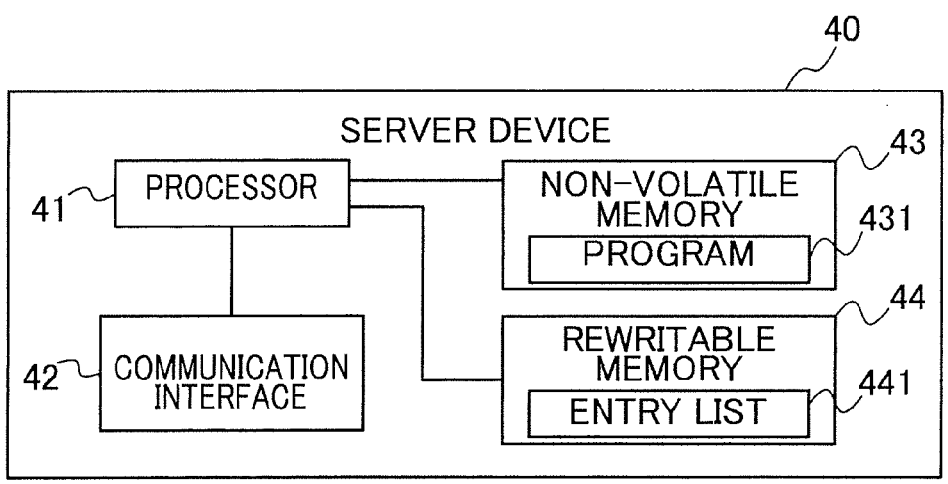
FIG. 3 is a block diagram showing a configuration of a server device 40 of game system 100.

Server Device:

FIG. 3 is a block diagram showing a configuration of server device 40. As shown in the figure, server device 40 is provided with a processor 41, a communication interface 42, a non-volatile memory 43, and a rewritable memory 44. Processor 41 is, for example, at least one CPU. Communication interface 42 is for transmitting and receiving signals to and from router 30 and for relaying data from processor 41 to router 30 and vice versa. Processor 41 uses communication interface 42 to exchange data with another device.

Non-volatile memory 43 is, for example, a ROM or a hard disk, and it stores a program 431 therein. Program 431, being executed by processor 41, causes server device 40 to perform various processes such as a matching process and other processes, which will be described later. Rewritable memory 44 is, for example, a RAM, and stores an entry list 441 therein, the entry list showing a secured amount for each game terminal 10 (candidates for a communication node) that is not yet a part of any player group, from among game terminals 10 having transmitted grouping requests.

Figures 4, 5:
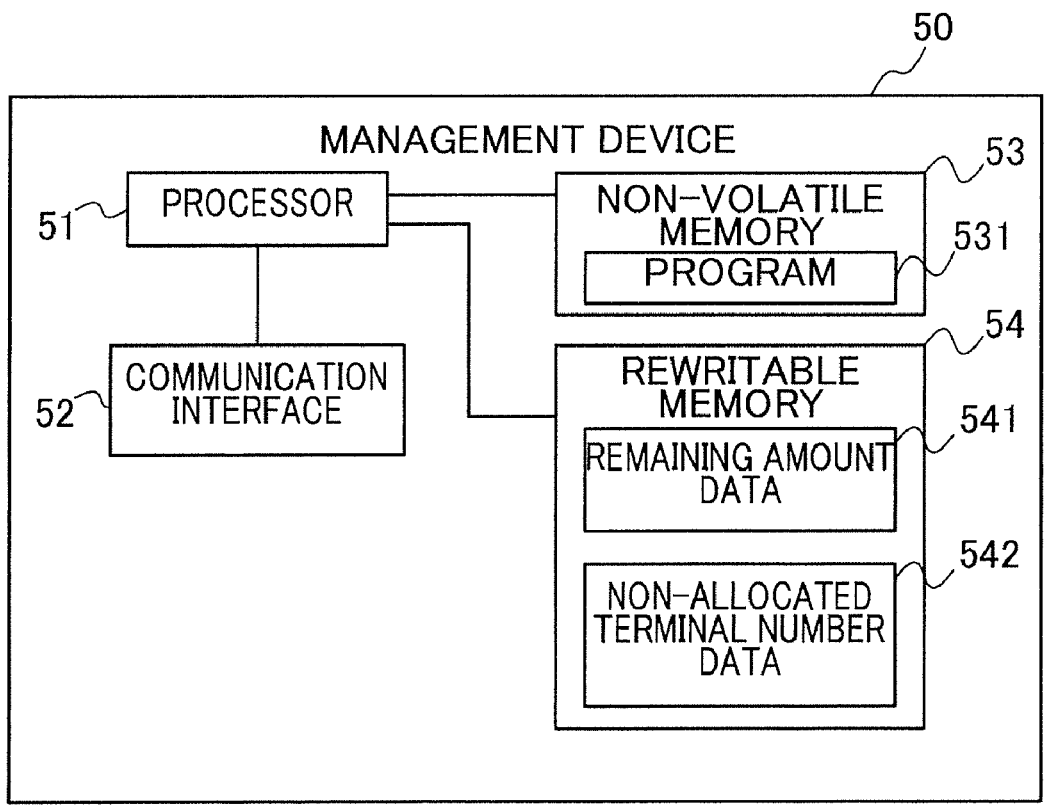
FIG. 4 is a schematic diagram showing a data configuration of an entry list 441 of the server device 40.
FIG. 5 is a block diagram showing a configuration of a management device 50 of game system 100.

FIG. 4 is a schematic diagram showing a data configuration of entry list 441. As shown in the figure, entry list 441 is a sequence of pieces of entry data showing a communication address of game terminal 10 and secured amount thereof. This sequence is in a chronological order, and new entry data is added to the bottom of entry list 441 every time a grouping request is received from game terminal 10. Entry data of game terminal 10 that has become a part of a new player group is deleted from entry list 441 once the player group is formed.

Management Device:

FIG. 5 is a block diagram showing a configuration of management device 50. Management device 50 is provided with a processor 51, a communication interface 52, a non-volatile memory 53, and a rewritable memory 54. Processor 51 is, for example, at least one CPU. Communication interface 52 is for transmitting and receiving signals to and from LAN 25 and relays data from processor 51 to LAN 25 and vice versa. Processor 51 uses communication interface 52 to exchange data with another device.

Non-volatile memory 53 is, for example, a ROM and a hard disk, and it stores a program 531. Program 531, being executed by processor 51, causes management device 50 to perform various processes such as a management process and other processes, which will be described later. Rewritable memory 54 is, for example, a RAM, and stores remaining amount data 541 showing the remaining amount of the bandwidth of a communication path allocated to the communication group which this management device 50 manages and non-allocated terminal number data 542 showing the number of game terminals 10 to which the bandwidth is not yet allocated (hereinafter referred to as "non-allocated terminal number").

Figure 6:
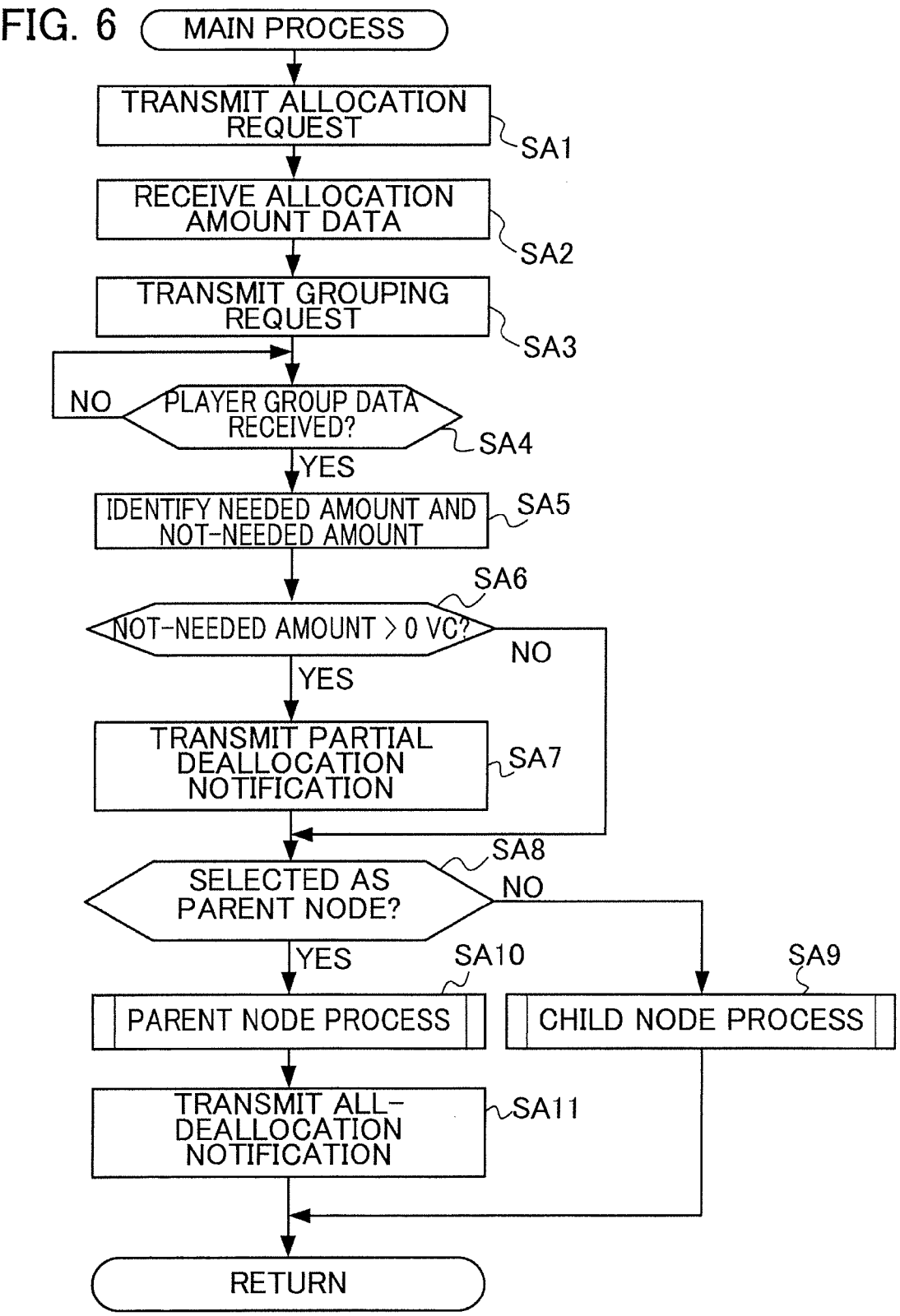
FIG. 6 is a flowchart showing a main process performed by a processor 11 of game terminal 10.

Main Process:

FIG. 6 is a flowchart of a main process performed by processor 11 of game terminal 10. Processor 11 executes the main process when an operation signal is supplied thereto from input unit 14, the operation signal corresponding to an operation made to a start operator. In the main process, processor 11 transmits, to management device 50 (hereinafter referred to as a "responsible management device") corresponding to a communication group that includes game terminal 10 of the processor 11, an allocation request requesting the allocation of bandwidth (SA1).

Processor 11 then receives, from the responsible management device, allocation amount data indicating the allocated amount of bandwidth (hereinafter referred to as "allocation amount") as a response to the allocation request and updates secured amount data R so that it indicates the bandwidth indicated by the allocation amount data (SA2). Processor 11 generates a grouping request containing a piece of secured amount data indicating secured amount indicated by the updated secured amount data R, for transmission to server device 40 (SA3). Processor 11 then determines whether it has received player group data indicating a configuration of a formed player group (SA4). This determination is repeated until the determination changes to YES, i.e., until player group data is received. The bandwidth that a communication node requires during a game can be identified by the configuration of a player group. Therefore, at game terminal 10, player group data is data indicating the bandwidth that needs to be secured (hereinafter referred to as "needed amount") and is also data indicating the bandwidth that need not be secured (hereinafter referred to as "not-needed amount")

In a case in which a result of the determination in Step SA4 is YES, processor 11 stores the received player group data as player group data T in rewritable memory 19 and identifies the needed amount and the not-needed amount on the basis of the player group data T and the secured amount data R (SA5). Processor 11 then determines whether the identified not-needed amount is greater than 0 VC (SA6), identifies this non-needed amount as the bandwidth to be deallocated (hereinafter referred to as "deallocation amount") only in a case in which a result of the determination is YES, and transmits a partial deallocation notification indicating the identified deallocation amount to the responsible management device (SA7). The partial deallocation notification is data notifying the deallocation of a part of the allocated bandwidth. In Step SA7, processor 11 updates secured amount data R so that it indicates the identified need amount.

Processor 11 subsequently determines, based on player group data T, whether game terminal 10 of this processor 11 has been selected as a parent node (SA8). In a case in which the result of the determination is NO, processor 11 performs a child node process in which this game terminal 10 is caused to operate as a child node (SA), to terminate the main process. In a case in which a result of the determination in Step SA8 is YES, processor 11 performs a parent node process in which this game terminal 10 is caused to operate as a parent node (SA 10). When the parent node process ends and the predetermined game is finished, processor 11 transmits, to the responsible management device, an all-deallocation notification indicating the deallocation amount that is the same as the secured amount indicated by its secured amount data R, (SA11), to end the main process. The all-deallocation notification is data notifying the deallocation of all allocated bandwidth.

Figure 7:
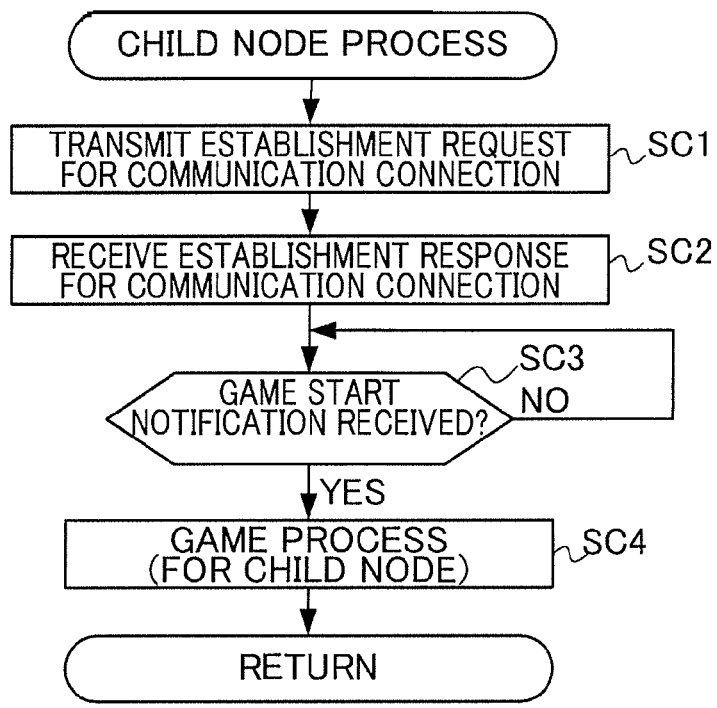
FIG. 7 is a flowchart showing a child node process performed by processor 11.

Child Node Process:

FIG. 7 is a flowchart showing a child node process performed by processor 11 of game terminal 10. In the child node process, processor 11 first determines a configuration of the player group to which game terminal 10 belongs, based on player group data T, and performs a process of establishing communication connection having the bandwidth of 1 VC with game terminal 10 that has been selected as a parent node. In this process, processor 11 transmits, to game terminal 10 selected as a parent node, an establishment request requesting the establishment of a communication connection (SC1) and receives from game terminal 10 an establishment response, which is a response to the establishment request (SC2).

Subsequently, processor 11 determines whether it has received a game start notification instructing the start of a game process, which will be described later (SC3). This determination is repeated until a result of the determination changes to YES, i.e., until processor 11 receives a game start notification. When a result of the determination in Step SC3 changes to YES, processor 11 performs a game process of advancing the predetermined game (SC4), to end the child node process.

In the game process, processor 11 generates an image based on operation signals supplied from input unit 14 and data from another game terminal 10 of a player group to which game terminal 10 of processor 11 belongs, so as to display the image on screen 151 of display unit 15.

Figure 8:
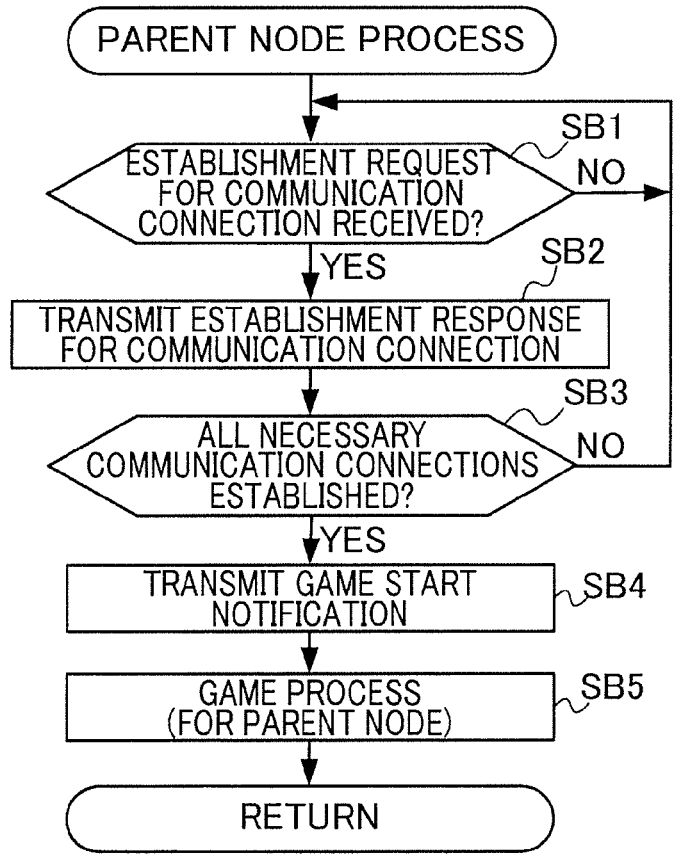
FIG. 8 is a flowchart showing a parent node process performed by processor 11.

Parent Node Process:

FIG. 8 is a flowchart showing a parent node process performed by processor 11 of game terminal 10. In the parent node process, processor 11 first determines a configuration of the player group to which this game terminal 10 belongs and performs a process of establishing a communication connection having the bandwidth of 1 VC with each of the game terminals 10 that have been selected as child nodes. In this process, processor 11 first determines whether it has received an establishment request from game terminal 10 selected as a child node (SB1). The determination is repeated until a result of the determination changes to YES, i.e., until processor 11 receives an establishment request. In a case in which a result of the determination in Step SB1 changes to YES, processor 11 transmits an establishment response to game terminal 10 that has transmitted the establishment request (SB2). Processor 11 then determines whether all the necessary communication connections are established (SB3). In a case in which a result of the determination is NO, processor 11 advances the routine to Step SB1.

In a case in which a result of the determination in Step SB3 changes to YES, processor 11 transmits a game start notification to each of the game terminals 10 that have been selected as child nodes (SB4). Processor 11 then performs a game process (SB5), to end the parent node process. The game process of Step SB5 is a game process for a parent node. That is, in the game process, other game terminals 10, which will be at the other end of the communication connection, will be the game terminals 10 that have been selected as child nodes, and therefore, the number of communication connections used in the communication will be the number of child nodes.

Figure 9:
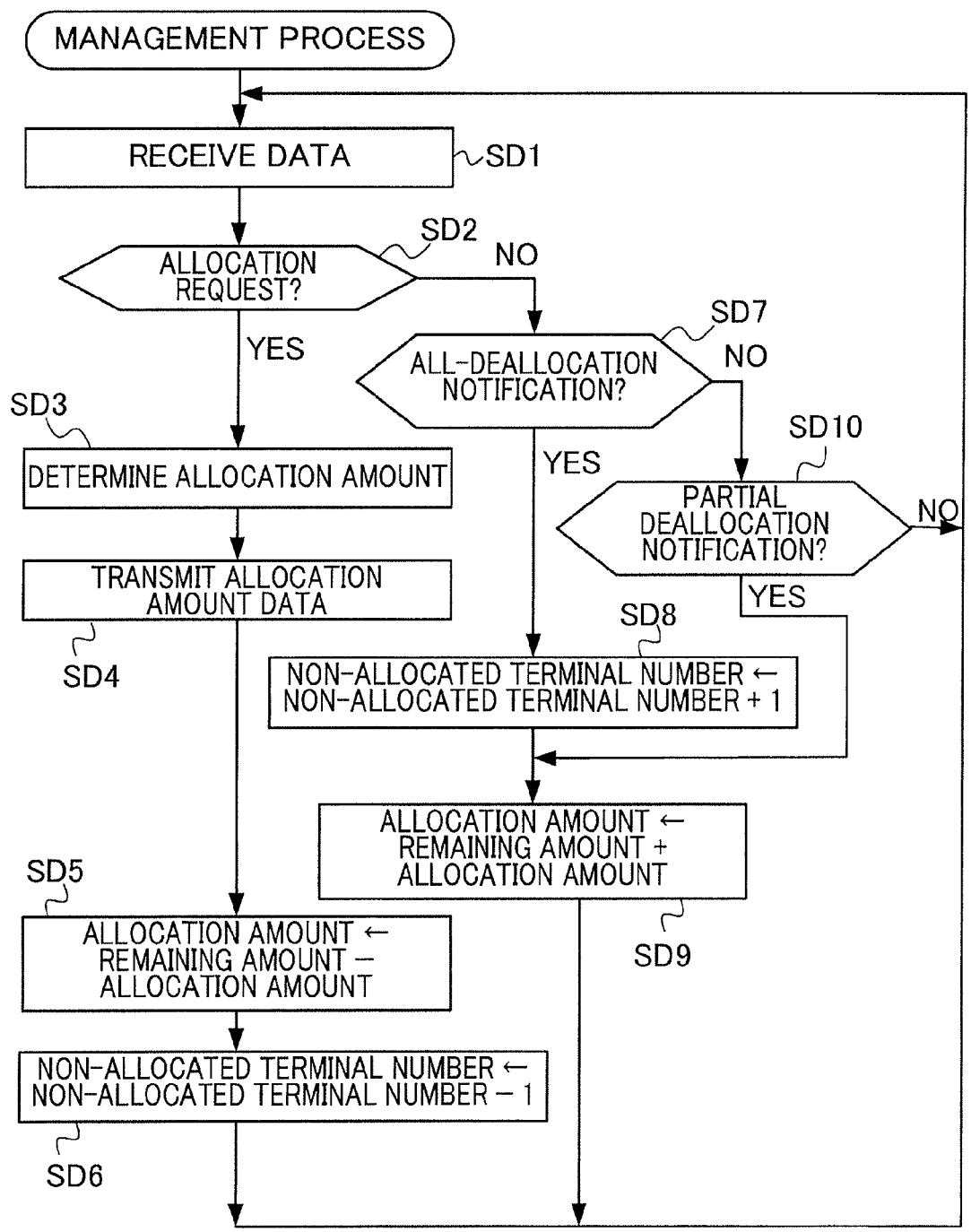
FIG. 9 is a flowchart showing a management process performed by a processor 51 of management device 50.

Management Process:

FIG. 9 is a flowchart showing a management process performed by processor 51 of management device 50. In the management process, processor 51 first receives data from game terminal 10 included in a counterpart communication group (SD1). Processor 51 then determines whether the received data is an allocation request (SD2). In a case in which a result of the determination is YES, processor 51 refers to remaining amount data 541 and non-allocated terminal number data 542 and determines the amount of allocation in accordance with a predetermined rule (SD3).

Specifically, in a case in which the amount of bandwidth that can be allocated (hereinafter referred to as "allocatable amount") to game terminal 10 that has transmitted the allocation request is equal to or greater than 7 VC, the allocation amount will be 7 VC; in a case in which the allocatable amount is less than 7 VC and equal to or greater than 5 VC, the allocatable amount will be the allocation amount as it is; and in a case in which the allocatable amount is less than 5 VC, the allocation amount will be 1 VC. It is to be noted that the allocatable amount is obtained by subtracting, from the remaining amount, the amount of bandwidth corresponding to the non-allocated terminal number minus 1. For example, in a case in which the non-allocated terminal number is three and the remaining amount is 14 VC, the allocatable amount will be 14 VC−(3−1)VC=12 VC.

Processor 51 subsequently transmits to the game terminal 10 that has transmitted the allocation request containing allocation amount data indicating the determined allocation amount (SD4). Processor 51 then updates the remaining amount data 541 so that the remaining data is reduced by the allocation amount (SD5) and updates non-allocated terminal number data 542 so that the non-allocated terminal number is reduced by 1 (SD6) and advances the process to Step SD1.

On the other hand, in a case in which a result of the determination in Step SD2 is NO, processor 51 determines whether the received data is an all-deallocation notification (SD7), i.e., determines whether the received data is data notifying the deallocation of all of the allocated bandwidth. In a case in which a result of the determination is "YES", processor 51 updates non-allocated terminal number data 542 so that the non-allocated terminal number is increased by 1 (SD8). Processor 51 then updates remaining amount data 541 so that the remaining amount is increased by the deallocation amount indicated by the all-deallocation notification (SD9) and advances the process to Step SD1.

In a case in which a result of the determination in Step SD7 is NO, processor 51 then determines whether the received data is a partial deallocation notification (SD10), i.e., determines whether the received data is data notifying the deallocation of a part of the allocated bandwidth. In a case in which a result of the determination is YES, processor 51 advances the process to Step SD9. Therefore, in this case, processor 51 updates remaining amount data 541 so that the remaining amount is increased by the deallocation amount indicated by the partial deallocation notification (SD9). On the other hand, in a case in which a result of the determination in Step SD10 changes to NO, processor 51 advances the process to Step SD1.

Figure 10:
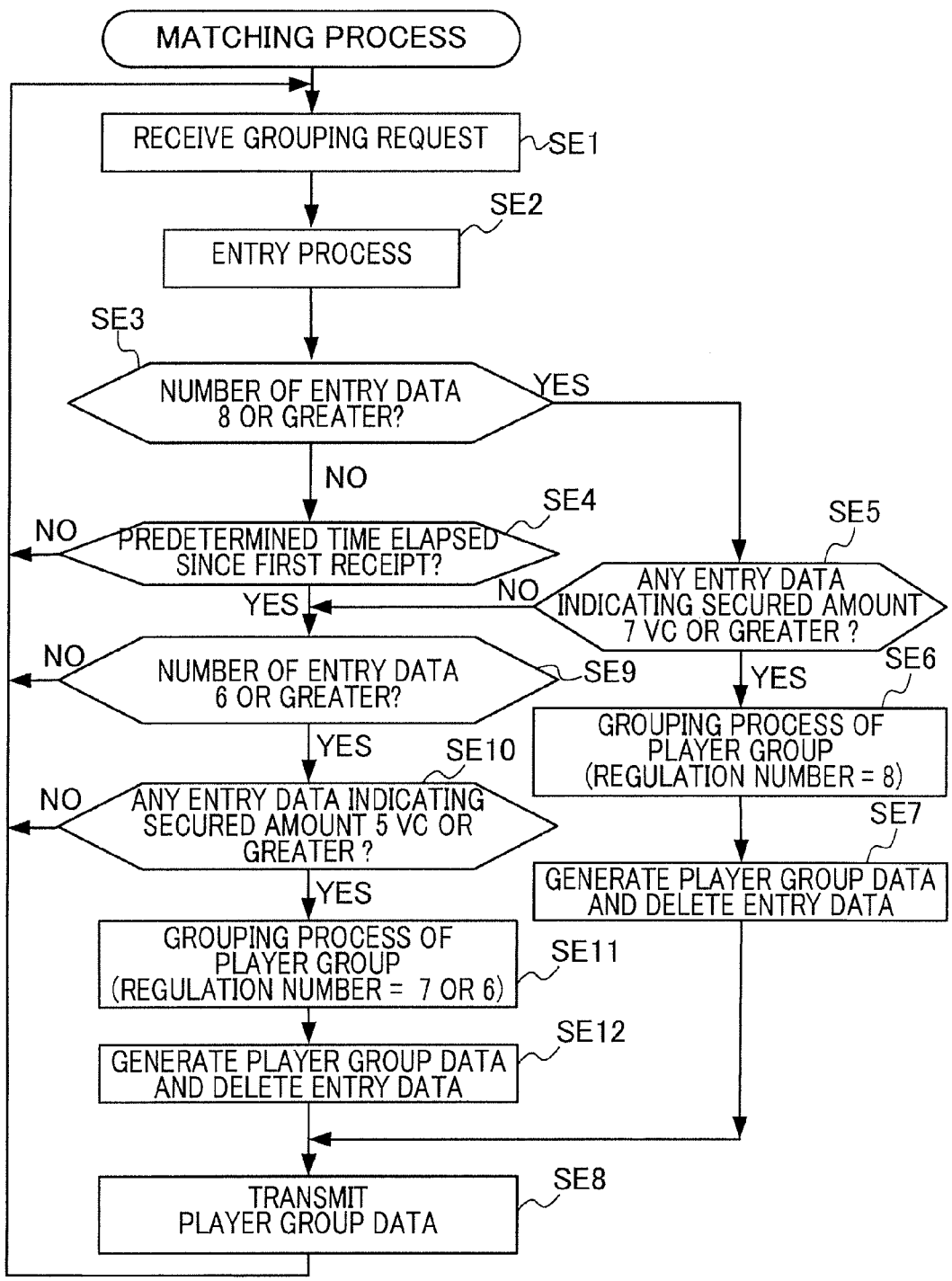
FIG. 10 is a flowchart showing a matching process performed by a processor 41 of server device 40.

Matching Process:

FIG. 10 is a flowchart of a matching process performed by processor 41 of server device 40. In the matching process, processor 41 first receives a grouping request from game terminal 10 included in game system 100 (SE1). Processor 41 subsequently performs an entry process (SE2). Specifically, processor 41 adds to the bottom of entry list 441 entry data indicating a communication address of game terminal 10 having transmitted the received grouping request and secured amount indicated by the piece of secured amount data included in the grouping request.

Subsequently, processor 41 determines whether the number of entry data pieces is equal to or greater than eight (the maximum value of the regulation number) (SE3). In a case in which a result of the determination is NO, processor 41 determines whether a predetermined time (T) has passed since the first receipt (SE4). The first receipt is the earliest (the oldest) receipt from among the receipts of grouping requests that have caused entry data pieces that have been stored in entry list 441 to be stored in entry list 441. As is obvious from the foregoing, processor 41 repeats the process from Steps SE1 to SE4 until a result of determination in Step SE3 or SE4 changes to YES.

In a case in which a result of the determination in Step SE3 changes to YES, processor 41 determines whether entry data indicating the secured amount of equal to or greater than 7 VC is in entry list 441 (SE5). Specifically, processor 41 determines whether a player group with the regulation number of eight can be formed. In a case in which the result of the determination changes to NO, processor 41 advances the process to Step SE4. In a case in which the result of the determination changes to YES, processor 41 performs a grouping process of forming a player group with the regulation number of eight (SE6). Specifically, game terminal 10 having a communication address shown in an entry data piece indicating the secured amount of equal to or greater than 7 VC is selected as a parent node, and game terminals 10 corresponding to communication addresses shown in the other seven entry data pieces are selected as child nodes. As a result of the selection, a player group in which the regulation number is eight is formed. It is to be noted that, regardless of the regulation number, the selection of a communication node in forming a player group is based on a result of comparison among the secured amounts, in entry list 441, of game terminals 10 indicated by the player group data.

Subsequently, processor 41 generates player group data indicating a configuration of the formed player group based on the above selection process and entry list 441 (SE7). In Step SE7, processor 41 also deletes from entry list 441 entry data pieces corresponding to game terminals 10 that are in the formed player group. Processor 41 then transmits the generated player group data to all game terminals 10 that are in the formed player group (SE8) and advances the process to Step SE1.

On the other hand, in a case in which a result of the determination in Step SE4 changes to YES after the predetermined time (T) has passed since the first receipt, processor 41 determines whether the number of entry data pieces included in entry list 441 is equal to or greater than six (the minimum value of the regulation number) (SE9). In a case in which the result of the determination is NO, processor 41 advances the process to Step SE1. In a case in which a result of the determination in Step SE9 is YES, processor 41 determines whether entry data showing the secured amount of equal to or greater than 5 VC is in entry list 441 (SE10), i.e., determines whether a player group with the regulation number of equal to or greater than six can be formed. In a case in which a result of the determination changes to NO, processor 41 advances the process to Step SE1.

In a case in which a result of the determination in Step SE10 is YES, processor 41 performs a grouping process of a player group in which the regulation number is seven or six (SE11). Specifically, processor 41 performs a grouping process of a player group with the regulation number of seven in a case in which entry data indicating the secured amount of equal to or greater than 6 VC is in entry list 411, and otherwise performs a grouping process of a player group with the regulation number of six. Each grouping process is the same as that in Step SE6 except for the number of child nodes.

Processor 41 subsequently generates player group data showing a configuration of a player group formed by the grouping process in Step SE11 based on the selection of a parent node and child nodes in Step SE 11 and entry list 441 (SE12). In Step SE12, entry data pieces corresponding to game terminals that are in the player group are deleted from entry list 441. Processor 41 then advances the process to Step SE8.

OPERATIONAL EXAMPLE

Description will be next given of an operational example of game system 100. In the operational example described herein, game terminal 10 of the venue A (hereinafter referred to as "game terminal 10A") communicates with management device 50 of the venue A (hereinafter referred to as "management device 50A") to transmit a grouping request in the first place, game terminal 10 of the venue B (hereinafter referred to as "game terminal 10B") communicates with management device 50 of the venue B (hereinafter referred to as "management device 50B") to transmit a grouping request in the second place, . . . and game terminal 10 of the venue C (hereinafter referred to as "game terminal 10C") communicates with management device 50 of the venue C (hereinafter referred to as "management device 50C") to transmit a grouping request in the eighth place. As a result, a player group is formed of game terminals 10, and the predetermined game is played in the player group. Specific description will be given below. It is assumed here that entry list 441 is in a state in which not a single piece of entry data is included.

Figure 12A:
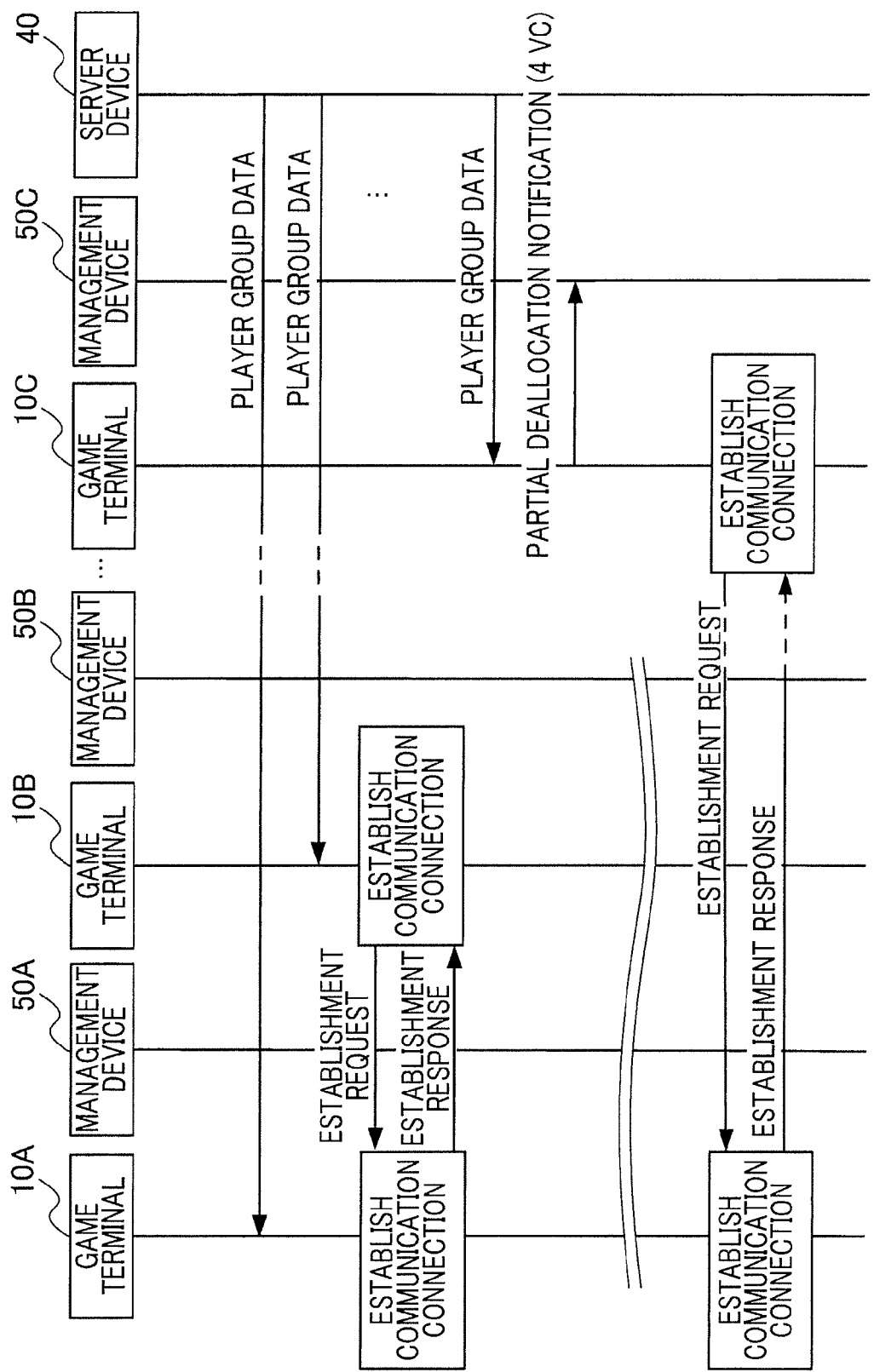
FIG. 12A is a sequence diagram showing the first operational example of game system 100.

FIGS. 11, 12A, and 12B are sequence diagrams showing a first operational example of game system 100, and the sequence shown in FIGS. 12A and 12B follow a sequence shown in FIG. 11. As shown in FIG. 11, a start instruction is first input with input unit 14 at game terminal 10A. Processor 11 of game terminal 10A then transmits to management device 50A an allocation request. It is assumed here that, in communication group 5A, the number of game terminals 10 to which bandwidth has not been allocated (non-allocated terminal number) is four, the bandwidth having been allocated to communication group 5A, and that the remaining amount indicated by remaining amount data 541 stored in rewritable memory 54 of management device 50A corresponds to the bandwidth (14 VC) of the communication group. Therefore, processor 51 of management device 50A that has received the allocation request determines the allocation amount as 7 VC, transmits to game terminal 10A allocation amount data indicating the bandwidth of 7 VC, updates remaining amount data 541 so that the remaining amount is reduced by 7 VC, and updates non-allocated terminal number data 542 so that the number of non-allocated terminals is reduced by 1. A part (7 VC) of the bandwidth allocated to communication group 5A is thus allocated to game terminal 10A.

Processor 11 of game terminal 10A, having received the allocation amount data, updates secured amount data R of rewritable memory 19 so that secured amount data R indicates the bandwidth indicated by the allocation amount data. Game terminal 10A thus secures the bandwidth of 7 VC. Processor 11 of game terminal 10A then generates a grouping request containing the secured amount (7 VC) indicated by secured amount data R of rewritable memory 19, for transmission to server device 40. Processor 41 of server device 40, having received the grouping request, performs an entry process in response to the grouping request. Specifically, processor 41 adds, to the bottom of entry list 441, entry data indicating a communication address of game terminal 10A that has transmitted this grouping request and secured amount (7 VC) indicated by the piece of secured amount data included in the grouping request. As a result, the contents of the entry list 441 will be as shown in FIG. 13.

Subsequently, a start instruction is input with input unit 14 at game terminal 10B. Processor 11 of game terminal 10B then transmits to management device 50B an allocation request. It is assumed here that, in communication group 5B, the number of game terminals 10 to which bandwidth has not been allocated (non-allocated terminal number) is one, the bandwidth having been allocated to communication group 5B, and that the remaining amount indicated by remaining amount data 541 stored in rewritable memory 54 of management device 50B is 1 VC. Therefore, processor 51 of management device 50B that has received the allocation request determines the allocation amount as 1 VC, transmits to game terminal 10B allocation amount data indicating the bandwidth of 1 VC, updates remaining amount data 541 so that the remaining amount is reduced by 1 VC, and updates non-allocated terminal number data 542 so that the number of non-allocated terminals is reduced by 1. A part (1 VC) of the bandwidth allocated to communication group 5B is thus allocated to game terminal 10B.

Processor 11 of game terminal 10B, having received the allocation amount data, updates secured amount data R of rewritable memory 19 so that secured amount data R indicates the bandwidth indicated by the allocation amount data. Game terminal 10B thus secures the bandwidth of 1 VC. Processor 11 of game terminal 10B then generates a grouping request containing the secured amount (1 VC) indicated by secured amount data R of rewritable memory 19, for transmission to server device 40. Processor 41 of server device 40, having received the grouping request, performs an entry process in response to the grouping request. As a result, the contents of entry list 441 will be as shown in FIG. 14.

In the subsequent processes, the same process as the above process for game terminal 10B is repeatedly performed for game terminals 10 in communication groups that are not any of communication groups 5A, 5B, or 5C, and five pieces of entry data are added to entry list 441. The secured amount indicated by each of the entry data pieces is 1 VC. As a result, the number of pieces of entry data will be seven in total.

Subsequently, a start instruction is input with input unit 14 at game terminal 10C. Processor 11 of game terminal 10C then transmits to management device 50C an allocation request. It is assumed here that, in communication group 5C, the number of game terminals 10 to which bandwidth has not been allocated (non-allocated terminal number) is three, the bandwidth having been allocated to communication group 5C, and that the remaining amount indicated by remaining amount data 541 stored in rewritable memory 54 of management device 50C is 7 VC. Therefore, processor 51 of management device 50C that has received the allocation request determines the allocation amount as 5 VC, transmits to game terminal 10C allocation amount data indicating the bandwidth of 5 VC, updates remaining amount data 541 so that the remaining amount is reduced by 5 VC, and updates non-allocated terminal number data 542 so that the number of non-allocated terminals is reduced by 1. A part (1 VC) of the bandwidth allocated to communication group 5C is thus allocated to game terminal 10C.

Processor 11 of game terminal 10C, having received the allocation amount data, updates secured amount data R of rewritable memory 19 so that secured amount data R indicates the bandwidth indicated by the allocation amount data. Game terminal 10C thus secures the bandwidth of 5 VC. Processor 11 of game terminal 10B then generates a grouping request containing the secured amount (5 VC) indicated by secured amount data R of rewritable memory 19, for transmission to server device 40. It is assumed here that processor 41 of server device 40 receives the grouping request from game terminal 10C before a predetermined time (T) has passed since the first receipt. In this case, "the first receipt" is a receipt of a grouping request from game terminal 10A.

Processor 41 of server device 40, having received the grouping request, performs an entry process in response to the grouping request. As a result, the contents of the entry list 441 will be as shown in FIG. 15. That is, the number of entry data pieces in entry list 441 is now eight in total, and in entry list 441 there is entry data indicating the secured amount of equal to or greater than 7 VC. Therefore, processor 41 of server device 40 performs a grouping process of forming a player group with the regulation number of eight. Specifically, game terminal 10A having a communication address indicated by the entry data showing the secured amount of equal to or greater than 7 VC is selected as a parent node, and game terminals 10 (including game terminals 10B and 10C) having communication addresses shown in the other seven entry data pieces are selected as child nodes. A player group with the regulation number eight is formed as a result of the selection.

Processor 41 then generates, based on the above selection and entry list 441, player group data showing a configuration of the formed player group, and deletes, from entry list 441, the eight pieces of entry data corresponding to game terminals 10 (including game terminals 10A, 10B, and 10C) that are in the formed player group. As a result, the number of pieces of entry data in entry list 441 will be zero. Processor 41 of server device 40 then transmits the player group data to each of the eight game terminals 10 (including game terminals 10A, 10B, and 10C) that are in the formed group as shown in FIG. 12A.

Processor 11 of each of the game terminals 10 (including game terminals 10A, 10B, and 10C), having received the player group data, stores the received player group data as player group data T in rewritable memory 19 and identifies the needed amount and the not-needed amount based on the player group data T and secured amount data R. Each processor 11 then determines, based on the player group data T, whether its game terminal 10 has been selected as a parent node, to perform a process depending on a result of the determination. Specifically, processor 11 of game terminal 10A performs a parent node process, and the other seven game terminals 10 (including game terminals 10B and 10C) each perform a child node process.

At game terminal 10C, the identified not-needed amount will be 4 VC. Therefore, processor 11 of game terminal 10C, before it performs a child process, transmits to management device 50C a partial deallocation notification indicating the deallocation amount that is the same as the not-needed amount. Processor 51 of management device 50C, having received the partial deallocation notification, updates remaining amount data 541 so that it is increased by the deallocation amount corresponding to the partial deallocation notification, i.e., 4 VC. As a result, the remaining amount at management device 50C will be 7 VC−5 VC+4 VC=6 VC.

In the child node process, each processor 11 of the seven game terminals 10 other than game terminal 10A transmits an establishment request to game terminal 10A that has been selected as a parent node. These establishment requests are received by processor 11 of game terminal 10A which is performing a parent node process. Processor 11 of game terminal 10A, having received each establishment request, transmits an establishment response to game terminal 10 that has transmitted the establishment request. The establishment responses each are received by processors 11 of the other seven game terminals 10. Thus, communication connection of 1 VC bandwidth is established between each child node and the parent node.

Once seven communication connections are established, processor 11 of game terminal 10A transmits a game start notification to each of game terminals 10 (including game terminals 10B and 10C) that have been selected as child nodes as shown in FIG. 12B. From this time on, processor 11 of game terminal 10A performs a game process for a parent node, and each processor 11 of the other seven game terminals 10 (including game terminals 10B and 10C) performs a game process for a child node. As a result, the predetermined game is played in the player group including game terminals 10A, 10B, and 10C. When the predetermined game is being played, communication is performed using communication connections between the parent nodes and the child node.

Once the predetermined game is completed, processor 11 of each of the eight game terminals 10 (including game terminals 10A, 10B, and 10C) constituting the player group transmits to management device 50 (responsible management device) an all-deallocation notification indicating the deallocation amount that is the same as the secured amount. Each management device 50, each having received the all-deallocation notification, updates non-allocated terminal number data 542 so that the number of non-allocated terminals is increased by 1 and updates remaining amount data 541 so that the remaining amount is increased by the deallocation amount indicated by the all-deallocation notification. As a result, the number of non-allocated terminals will be four at management device 50A, one at management device 50B, and three at management device 50C; and the remaining amount will be 14 VC at management device 50A, 1 VC at management device 50B, and 7 VC at management device 50C.

Figure 16:
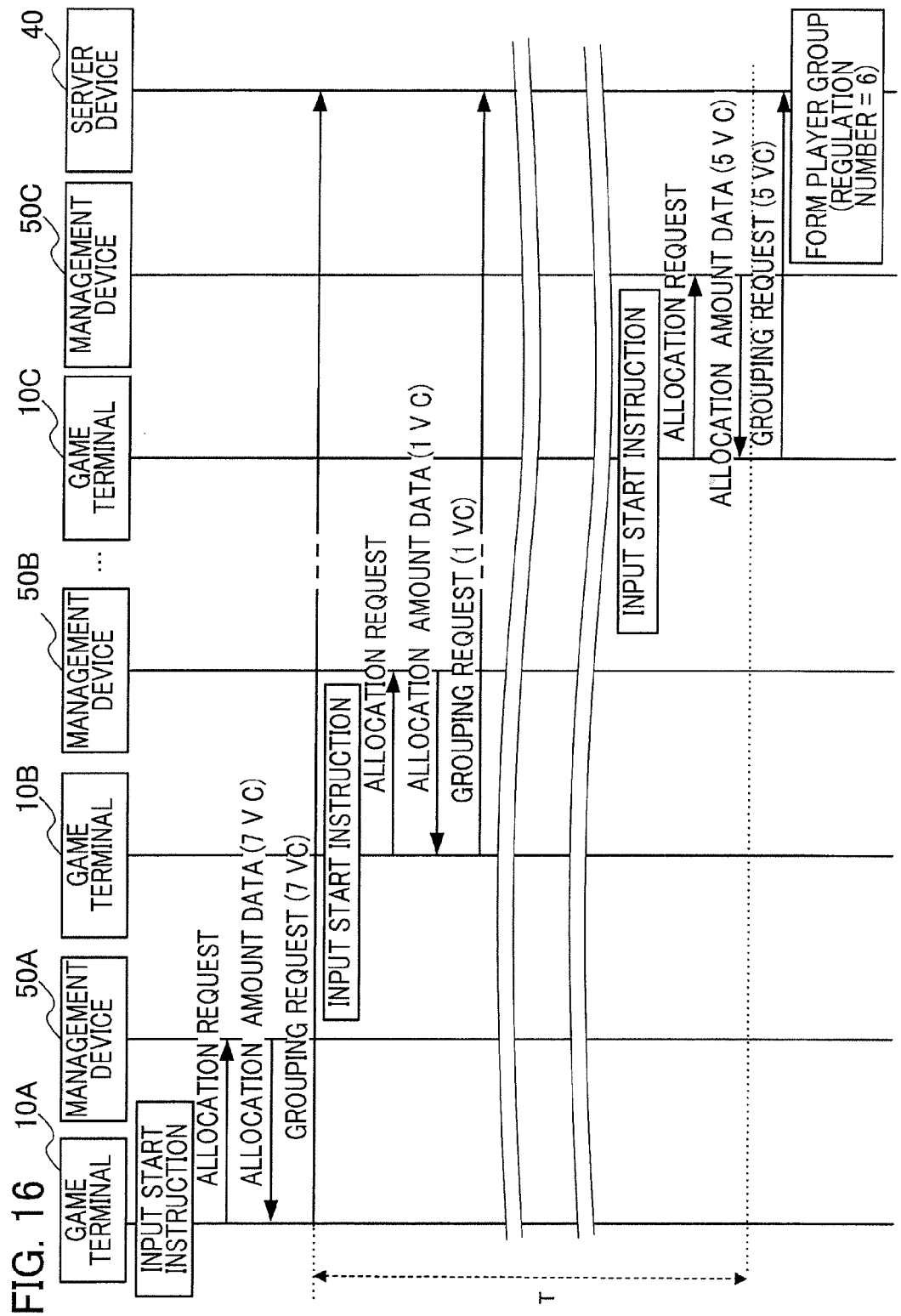
FIG. 16 is a sequence diagram showing a second operational example of game system 100.
Figure 17:
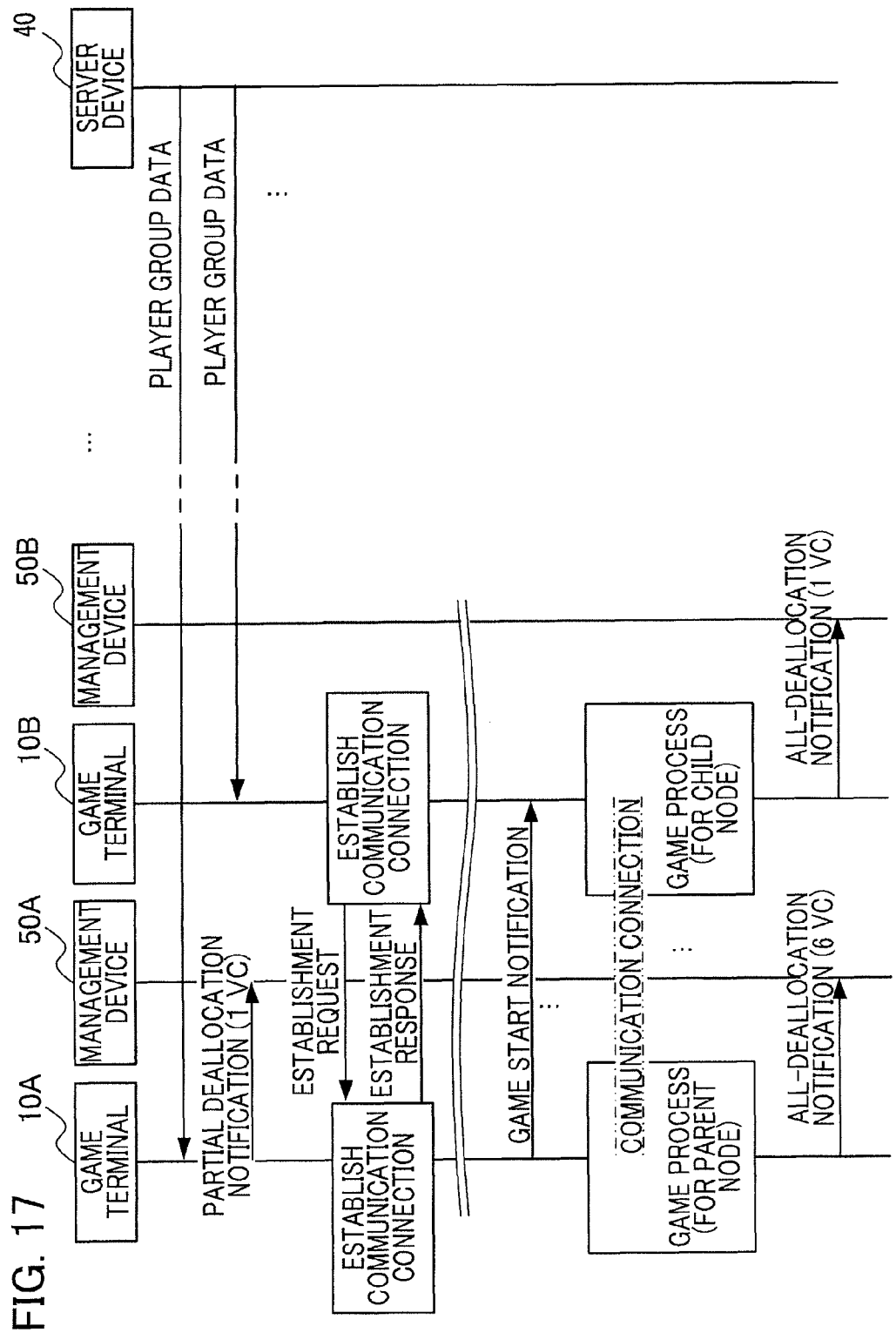
FIG. 17 is a sequence diagram showing the second operational example of game system 100.

FIGS. 16 and 17 are sequence diagrams showing a second operational example of game system 100, and the sequence shown in FIG. 17 follows after the sequence shown in FIG. 16. This operational example is different from the first operational example in that processor 41 of server device 40 receives a grouping request from game terminal 10C after the predetermined time (T) has passed since the first receipt (receipt of a grouping request from game terminal 10A) as shown in FIG. 16. Therefore, in the second operational example, the number of grouping requests which processor 41 of server device 40 receives is seven, including the first receipt, since the first receipt until the predetermined time (T) passes.

Accordingly, processor 41 of server device 40 performs a grouping process of a player group with the regulation number of seven, after the predetermined time (T) has passed since the first receipt. Specifically, processor 41 selects, as a parent node, game terminal 10A having a communication address shown in one piece of entry data indicating the secured amount that is the maximum among those with values equal to or greater than 6 VC and selects, as child nodes, game terminals 10 (including game terminal 10B) having communication addresses shown by the other six entry data. As a result of the selection, a player group with the regulation number of seven is formed.

The following operation is the same as the first operational example. However, the number pieces of entry data left in entry list 441 after the player group is formed will be one. Furthermore, as shown in FIG. 17, the process relating to game terminal 10C that is not in the same player group is eliminated. At game terminal 10A, the identified not-needed amount will be 1 VC. Therefore, processor 11 of game terminal 10A transmits to management device 50A a partial deallocation notification indicating the deallocation amount that is the same as the not-needed amount before it performs a parent node process. As a result, the remaining amount at management device 50A will be 14 VC−7 VC+1 VC=8 VC and will be 7 VC after the game process for a parent node.

Effects:

As described in the foregoing, in the present embodiment, for bandwidth of a communication path allocated to a communication group including game terminal 10 selected as a parent node or a child node, the bandwidth of the amount corresponding to the difference between the bandwidth secured for game terminal 10 and the bandwidth required while the predetermined game is being played is deallocated before the predetermined game is started. Therefore, according to the present embodiment, it is possible to avoid excess bandwidth that will never be used during the predetermined game from being secured for a long period, and the use efficiency of the bandwidth in the communication path is enhanced.

Furthermore, in the present embodiment, game terminal 10 that has secured a greater amount of bandwidth is selected as a parent node. That is, game terminal 10 corresponding to a communication path having a greater remaining amount is selected as a parent node which requires a greater amount of bandwidth than a child node does. Therefore, according to the present embodiment, the remaining amount of the bandwidth in a communication path can be leveled among communication paths.

Additionally, in the present embodiment, a player group with the regulation number that is not the maximum regulation number cannot be formed before a predetermined time (T) passes since the first receipt but can be formed after the predetermined time has passed. This means that a group with the maximum regulation number can be formed during a period in which there is low probability of a player becoming hesitant to play the game and that a player group with the regulation number that is not the maximum regulation number can be formed during a period in which there is a greater probability of a player becoming hesitant. Therefore, according to the present embodiment, it is possible to keep a player from becoming hesitant to play the game while maintaining the gameworthiness or playworthiness of the predetermined game at a high level.

Furthermore, as described above, the bandwidth secured for each game terminal 10 is 1 VC, 5 VC, 6 VC, or 7 VC, the total bandwidth of each of which is required in a case in which game terminal 10 is selected as a child node or selected as a parent node. As is obvious from the above, according to the present embodiment, there is no need to secure the bandwidth in the first place that will certainly be excessive, such as the bandwidth that is greater than 1 VC but is smaller than 5 VC or the bandwidth that is greater than 7 VC. This leads to the effective use of the bandwidth and also to the reduction in the number of times of transmission and receipt of a partial deallocation notification.

Modifications:

The above-described embodiments can be modified as described in the following. These modifications are included in the scope of the invention.

For example, the above embodiment may be modified to a mode in which the control based on the predetermined time (T) is removed and may be further modified to a mode in which forming a player group with a smaller regulation number takes precedence. This mode is suitable for a game in which the regulation number with a smaller number is preferable, and the number of communication paths with no remaining bandwidth can be increased according to this mode. For another example, the above embodiment may be modified to a mode in which bandwidth that will certainly be excessive may be secured so that the secured bandwidth that will certainly be excessive is deallocated before a grouping request is transmitted to server device 40. Description will be now given of a combination of these modifications as Modification 1 with reference to the drawings.

Figure 18:
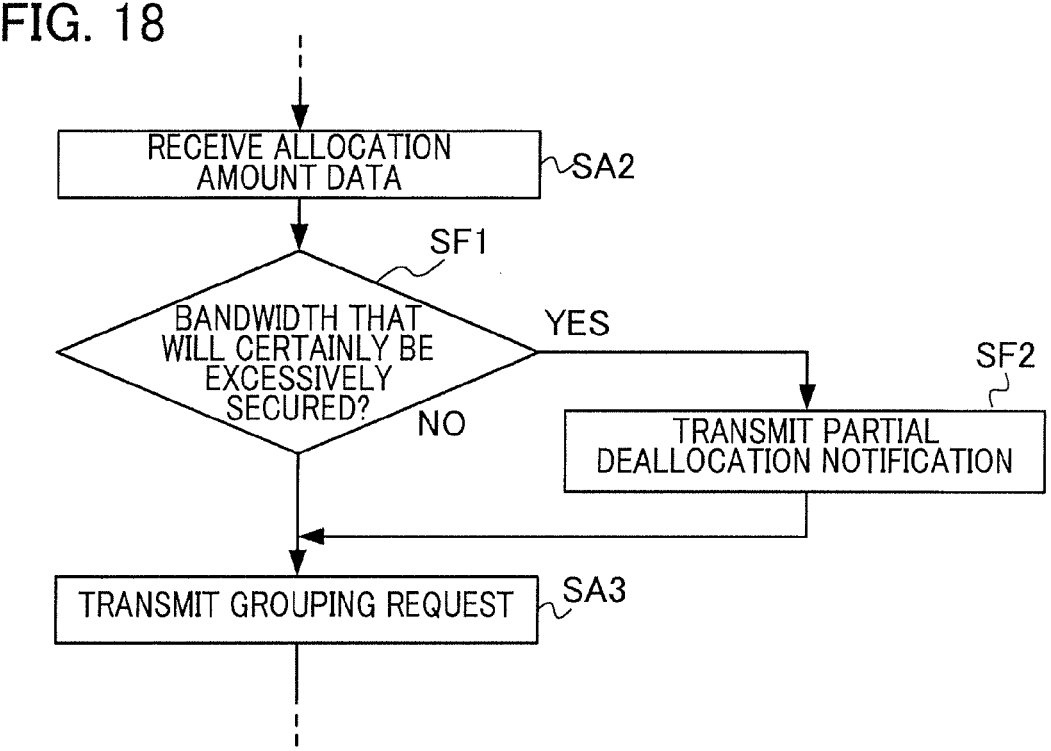
FIG. 18 is a flowchart showing a part of the main process executed by processor 11 in a first modification of the present embodiment.
Figure 19:
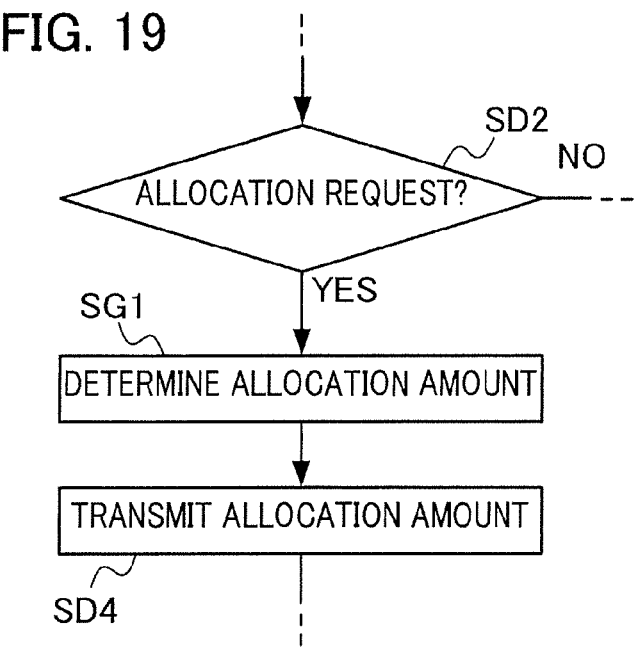
FIG. 19 is a flowchart showing a part of the management process executed by processor 51 in the first modification.

FIG. 18 is a flowchart showing a part of the main process performed by processor 11 of game terminal 10 in Modification 1. The steps that are not shown in this figure are the same as those in FIG. 6. FIG. 19 is a flowchart showing a part of the management process performed by processor 51 of management device 50 in Modification 1. The steps that are not shown in this figure are the same as those in FIG. 9.

As shown in FIG. 19, processor 51 of management device 50, upon receiving the allocation request from game terminal 10 included in a communication group which the device 50 is responsible for, determines the allocation amount in accordance with predetermined rules (SG1). Specifically, the bandwidth that can be allocated to game terminal 10 having transmitted the allocation request is determined as the allocation amount. On the other hand, as shown in FIG. 18, processor 11 of game terminal 10 receives from the responsible management device the allocation amount data indicating the allocation amount as a response to the allocation request and updates secured amount data R of rewritable memory 19 so that secured amount data R indicates the bandwidth indicated by the allocation amount data. Processor 11 then determines whether the bandwidth that will certainly become excess was secured (SF1). Specifically, processor 11 determines whether the bandwidth indicated by secured amount data R (the secured amount) is within a predetermined range. A result of the determination changes to YES in case in which the secured amount is greater than 1 VC and less than 5 VC or in a case in which the secured amount is greater than 7 VC, whereas a result of the determination changes to NO in a case in which the secured amount is 1 VC or in a case in which the secured amount is equal to or greater than 5 VC and is equal to or less than 7 VC.

In a case in which a result of the determination in Step SF1 is YES, processor 11 of game terminal 10 identifies the bandwidth that will certainly be excessive as the deallocation amount to transmit a partial deallocation notification showing the identified deallocation amount to the responsible management device (SF2). The bandwidth that will certainly be excessive is obtained by subtracting 1 VC from the secured amount in a case in which the secured amount is greater than 1 VC and less than 5 VC or by subtracting 7 VC from the secured amount in a case in which the secured amount is greater than 7 VC. In Step SF2, processor 11 updates secured amount data R so that it indicates 1 VC in a case in which the secured amount is larger than 1 VC and less than 5 VC or so that it indicates 7 VC in a case in which the secured amount is greater than 7 VC. Processor 11 of game terminal 10 then advances the process to Step SA3. In a case in which a result of the determination in Step SF1 is NO, processor 11 of game terminal 10 advances the process to Step SA3.

Figure 20:
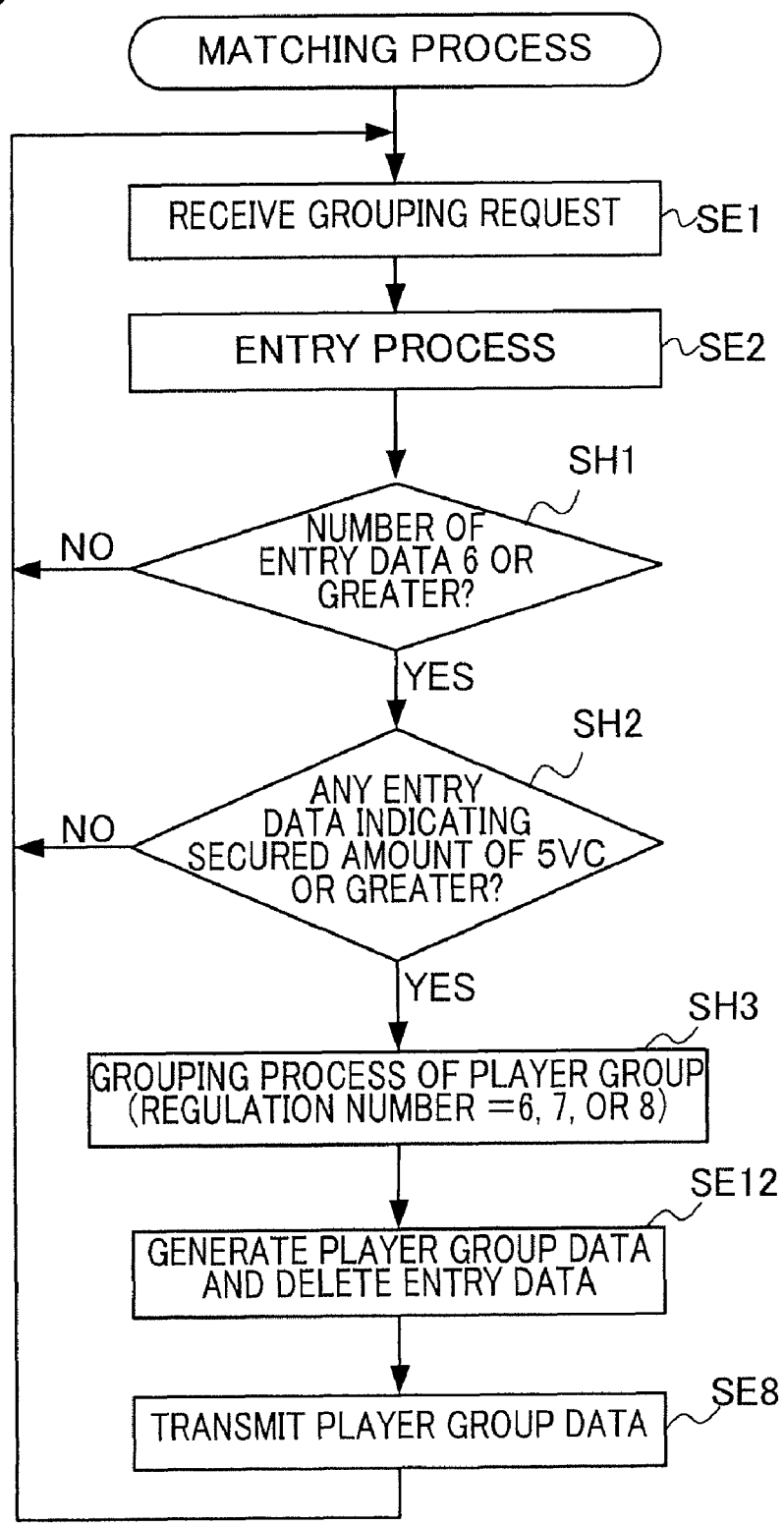
FIG. 20 is a flowchart showing a part of the matching process executed by processor 41 in the first modification.

FIG. 20 is a flowchart showing a part of a matching process performed by processor 41 of server device 40 according to server device 40. As shown in the figure, processor 41 of server device 40, upon receiving a grouping request (SE1) and performing an entry process (SE2), determines whether the number of pieces of entry data included in entry list 441 is equal to or greater than six (the minimum regulation number) (SH1).

In a case in which a result of the determination is NO, processor 41 advances the process to Step SE1. In a case in which a result of the determination is YES, it determines whether there is any entry data showing the secured amount of equal to or greater than 5 VC in entry list 441 (SH2), i.e., determines whether a player group with the regulation number of six or greater can be formed. If a result of the determination is NO, processor 41 advances the process to Step SE1.

In a case in which a result of the determination in Step SH2 is YES, processor 41 performs a grouping process of a player group with the regulation number of six, seven, or eight (SH3). Specifically, in a case in which entry data indicating the secured amount of 5 VC is in entry list 441, a player group with the regulation number of six is formed, and otherwise, a player group with the regulation number of seven or eight is formed. More specifically, in a case in which entry data indicating the secured amount of 6 VC is in entry list 441, a player group with the regulation number of seven is formed, and otherwise, a player group with the regulation number of eight is formed. Each grouping process is the same as the grouping process in Step SE 6 of FIG. 10 except for the number of child nodes.

Processor 41 subsequently generates player group data showing a configuration of a player group formed in the grouping process of Step SH3 and deletes the entry data pieces corresponding to game terminals 10 that are in the player group from entry list 441 (SE12). The subsequent process is the same as that shown in FIG. 10.

Modification 1 may be further modified to a mode in which a player group with the regulation number of a greater number is given priority in forming a group and may also be modified to a mode in which the bandwidth that will certainly be excessive is deallocated after a grouping request is transmitted to server device 40 and before forming a player group (Modification 2). Description will be now given of Modification 2 with reference to the drawings.

Figure 21:
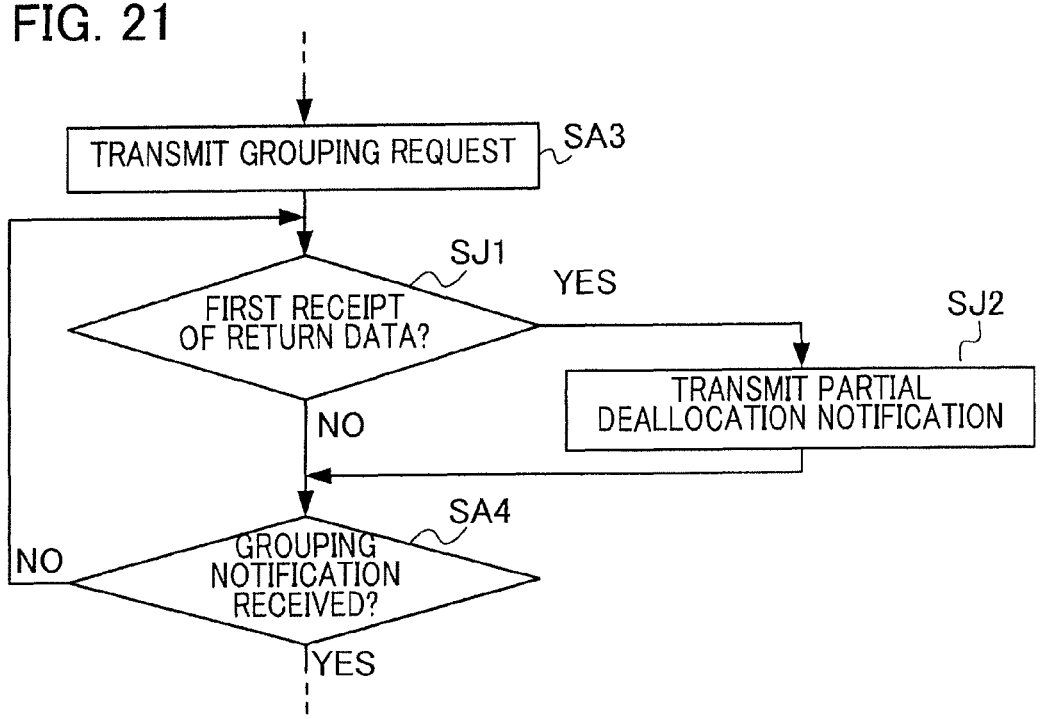
FIG. 21 is a flowchart showing a part of the main process executed by processor 11 in a second modification.
Figure 22:
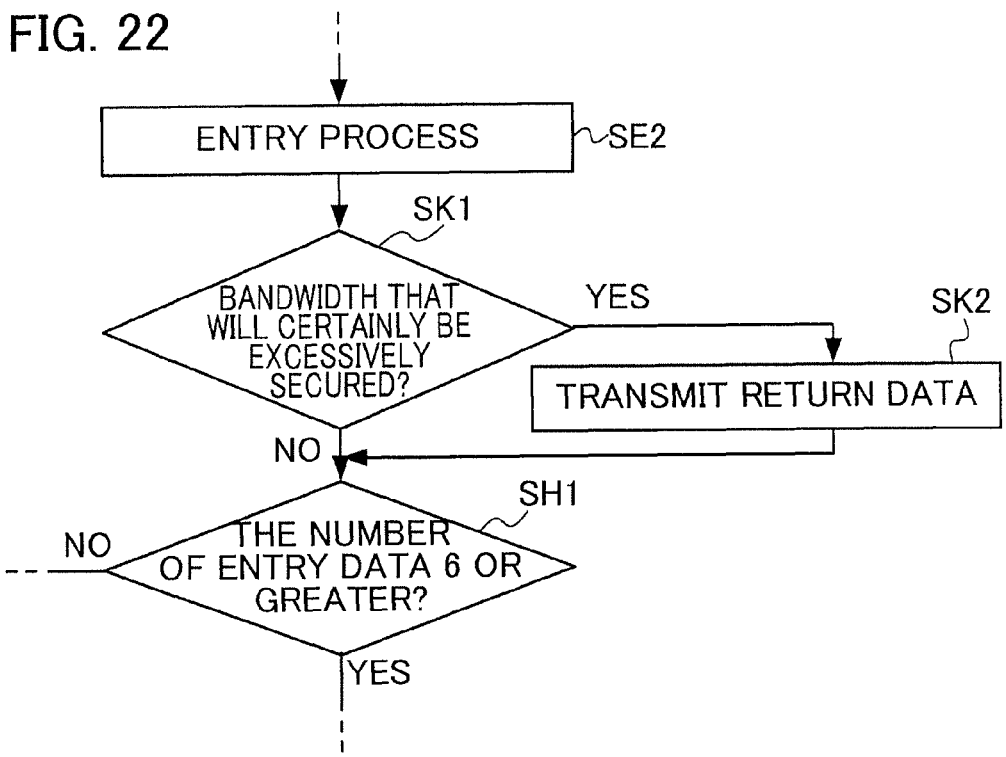
FIG. 22 is a flowchart showing a part of the matching process executed by processor 41 in the second modification.

FIG. 21 is a flowchart showing a part of the main process performed by processor 11 of game terminal 10 in Modification 2. The steps that are not shown in this figure are the same as those in FIG. 6. FIG. 22 is a flowchart showing a part of the matching process performed by processor 41 of server device 40 in Modification 2. The steps that are not shown in this figure are the same as those in FIG. 20. In Modification 2, the management process performed by processor 51 of management device 50 is the same as that shown in FIG. 19.

As described in relation to Modification 1, processor 51 of management device 50, upon receiving an allocation request from game terminal 10 included in a communication group which this management device 50 is responsible for, determines, as the allocation amount, the amount of the bandwidth that can be allocated to game terminal 10 having transmitted the allocation request. As is clear from FIGS. 19 and 21, the allocation amount will be the secured amount, and a grouping request indicating the secured amount is transmitted from game terminal 10 to server device 40 (SA3).

Processor 41 of server device 40, upon receiving the grouping request and performing the entry process (SE2), determines whether the bandwidth that will certainly be excessive is secured (SK1). Specifically, processor 41 determines whether the bandwidth (secured amount) indicated by entry data created in response to the grouping request is within a predetermined range. A result of the determination will change to YES in a case in which the secured amount is greater than 1 VC and less than 5 VC or in a case in which the secured amount is greater than 7 VC, whereas a result of the determination will change to NO in a case in which the secured amount is equal to or greater than 5 VC and is equal to or less than 7 VC.

In a case in which a result of the determination in Step SK1 is YES, processor 41 transmits return data indicating bandwidth that will certainly be excessive to game terminal 10 having transmitted the grouping request and updates entry list 441 so that the entry data shows 1 VC in a case in which the bandwidth indicated in the entry data is greater than 1 VC and less than 5 VC or so that that the entry data shows 7 VC in a case in which the bandwidth indicated in the entry data is greater than 7 VC (SK2). Processor 41 then advances the process to Step SH1. In a case in which a result of the determination in Step SK1 is NO, processor 41 advances the process to Step SH1.

Processor 11 of game terminal 10 determines, during a period since it transmits a grouping request until it receives a grouping notification, whether it receives the return data for the first time during this period (SJ1). A result of the determination changes to YES only immediately after receiving the return data. In a case in which a result of the determination in Step SJ1 is YES, processor 11 identifies the bandwidth indicated by the received return data as the deallocation amount to transmit a partial deallocation notification indicating the identified deallocation amount to its responsible management device (SJ2). As a result, the remaining amount will increase by the amount corresponding to the deallocation amount. In Step SJ2, processor 11 updates secured amount data R in rewritable memory 19 so that the secured amount is decreased by the amount corresponding to the deallocation amount. Processor 11 of game terminal 10 then advances the process to Step SA4. In a case in which a result of the determination in Step SJ1 is NO, processor 11 advances the process to Step SA4.

Furthermore, in the above embodiment, game terminal 10 and management device 50 are different devices, but the above embodiment may be modified to a mode in which a particular game terminal 10 concurrently serves as management device 50. Such a mode includes having a predetermined one of game terminals 10 of each communication group function as management device 50 corresponding to the communication group. Specifically, a communication address of game terminal 10 functioning as management device 50 corresponding to a communication group including game terminal 10 is stored in non-volatile memory 18 of each game terminal 10, and each game terminal 10 transmits an allocation request to game terminal 10 having the stored communication address.

Alternatively, game terminal 10 may concurrently serve as management device 50, for example, by having a freely selected one of game terminals 10 function as a management device. Specifically, each game terminal 10 queries every game terminal 10 of a communication group in which game terminal 10 is included, before transmitting an allocation request, to identify the game terminal 10 that is functioning as management device 50 corresponding to the communication group and transmits the allocation request to the identified game terminal 10.

A method of realizing the mode of game terminal 10 concurrently serving as management device 50 can be, for example, having game terminal 10 serving as management device 50 execute a process providing the function of game terminal 10 and a process providing the function of management device 50 in parallel. In the mode realized by this method, the communication between management device 50 and game terminal 10, concurrently functioning as management device 50 will be the so-called "InterProcess Communication".

Furthermore, a modification may be made such that management device 50 is not provided. There are various ways of managing bandwidth in this modification. For example, rewritable memory 19 of each game terminal 10 may store data showing the remaining amount of bandwidth of its communication path so that, when the remaining amount is updated at one game terminal, the remaining amount in other game terminals in the same communication group are updated accordingly, for example, by performing communication between game terminals 10.

Furthermore, in management device 50, the allocation amount may be decided regardless of the number of non-allocated terminals. In this case, however, the relationship among the range of the number of child nodes, the number of game terminals 10, and the bandwidth of a communication path should be properly set. By doing so, a situation can be avoided in which the bandwidth game terminal 10 can secure is ultimately only less than 1 VC.

Furthermore, a player group with the regulation number of seven may be formed with higher priority. Furthermore, the number of communication nodes included in a player group may be modified to be four or more. Also, the number of game terminals included in a communication group may be modified to be between one and three, inclusive, or five or more, or may be modified so that the number varies among each communication group. Alternatively, the bandwidth of a communication may other than 14 VC and may vary for different communication groups. Also, data showing bandwidth that will certainly be excessive may be included in player group data transmitted to game terminal 10 so that the bandwidth is deallocated based on the data.

Furthermore, a server device may request that a game terminal play the game alone, or with two or more, even in a case in which the minimum regulation number of terminals cannot be grouped in one player group within the predetermined time period as a result of the matching process.

The invention claimed is:

1. A game system comprising:
plural communication groups, each having been allocated different communication paths from one another and each including plural game terminals sharing the communication path allocated to the respective communication groups; and
a server device communicating with the game terminals via the communication path
wherein each of the plural game terminals of the plural communication groups comprises:
an inputter that receives an instruction input by a player;
a securer that secures, upon a predetermined instruction being input via the inputter, bandwidth that is equal to or greater than a certain amount of bandwidth necessary for communication with another of the game terminals and is equal to or less than the a remaining amount of bandwidth of a communication path used for the game terminal;
a grouping request transmitter that transmits a grouping request for requesting formation of a player group of terminals which will play a multiple player game to the server device, the grouping request also indicating the bandwidth secured by the securer;
a player group data receiver that receives the player group data indicating the configuration of the player group from the server device;
a controller that controls, on the basis of the player group data, communication during the game;
a deallocation bandwidth identifier that identifies, as bandwidth to be deallocated, the difference between the bandwidth secured by the securer and bandwidth that will be required at the game terminal in the player group having the configuration indicated by the player group data; and
a deallocator that deallocates the bandwidth to be deallocated,
the server device comprising:
a grouping request receiver that receives the grouping request from the game terminals;
a secured amount storage that stores a piece of secured amount data indicating the bandwidth indicated by the grouping request in association with a game terminal that has transmitted the grouping request;
a grouper that forms the player group based on the piece of secured amount data stored in the secured amount storage by selecting one of the game terminals stored in the secured amount storage as a parent node and a number of game terminals stored in the secured amount storage as child nodes, wherein the number of child nodes varies for different player groups within a range having an upper limit and a lower limit, wherein the child nodes of the player group each exclusively use the certain amount of bandwidth for the communication with the parent node of the player group; a player group data transmitter that transmits the player group data of the player group to each of the game terminals that are selected, through the selection by the grouper, wherein the grouper compares bandwidth indicated by the pieces of secured amount data for game terminals, the comparison of the bandwidths being performed among the game terminals of the number that is greater than the number of child nodes to be selected for the player group, and selects as the parent node one game terminal corresponding to the piece of secured amount data indicating a bandwidth that is found to be the largest by the comparison.

2. A game system according to claim 1, further comprising plural management devices that are provided for the respective communication groups and are capable of communicating respectively with the plural game terminals of the communication group to which each management device corresponds,
wherein the securer has an allocation requester that transmits an allocation request requesting allocation of bandwidth to the management device corresponding to the communication group including the game terminal and an allocation data receiver that receives allocation amount data indicating bandwidth allocated to the game tetininal, and the securer secures bandwidth based on the allocation amount data; and
wherein the deallocator has a deallocation notification transmitter that transmits a deallocation notification indicating the bandwidth to be deallocated to the management device corresponding to the communication group including the game terminal,
each of the plural management devices comprising:
a remaining amount storage that stores remaining amount data indicating the remaining amount of bandwidth in the communication path allocated to the corresponding communication group;
an allocation request receiver that receives the allocation request;
an allocation processor that, upon receiving the allocation request by the allocation request receiver, determines, based on the remaining data, bandwidth to be allocated to a game terminal that has transmitted the allocation request, transmits the allocation amount data indicating the determined bandwidth to the game terminal that has transmitted the allocation request, and updates the remaining amount data so that the remaining amount is reduced by the amount of bandwidth;
a deallocation notification receiver that receives the deallocation notification; and
a deallocation processor that, upon receiving the deallocation notification by the deallocation notification receiver, updates the remaining amount data so that the remaining amount is reduced by the amount of bandwidth indicated by the deallocation notification.

3. A game system according to claim 1,
wherein the securer secures bandwidth corresponding to the upper limit in a case in which the remaining amount of bandwidth of a communication path used by the game terminal is greater than the bandwidth corresponding to the upper limit.

4. A game system according to claim 1
wherein the lower limit is two or greater; and
wherein the securer secures the certain amount of bandwidth in a case in which the remaining amount of bandwidth of a communication path used by the game terminal is less than the bandwidth corresponding to the certain amount of bandwidth.

5. A game system according to claim 1,
wherein the server device further comprises a first returner that determines, upon receiving the grouping request, whether bandwidth indicated by the grouping request is greater than bandwidth corresponding to the upper limit and that, if a result of the determination is affirmative, transmits first return data indicating bandwidth of the difference therebetween to the game terminal that has transmitted the grouping request and regards the piece of secured amount data stored by the secured amount storage in association with the game terminal as indicating bandwidth corresponding to the upper limit,
each of the plural game terminals of the plural communications group further comprising:
a first return data receiver that receives the first return data; and
a first deallocation identifier that, upon receiving the first return data, identifies bandwidth indicated by the first return data as the bandwidth to be deallocated, and wherein the deallocator deallocates bandwidth to be deallocated when the bandwidth to be deallocated is identified.

6. A game system according to claim 1, wherein the server device further comprises a second returner that determines, upon receiving the grouping request, whether bandwidth indicated by the grouping request is less than bandwidth corresponding to the lower limit and is greater than the certain amount of bandwidth and that, if a result of the determination is affirmative, transmits second return data indicating bandwidth of the difference between the bandwidth indicated by the grouping request and the certain amount of bandwidth to the game terminal that has transmitted the grouping request and regards the piece of secured amount data stored by the secured amount storage in association with the game terminal as indicated the certain amount of bandwidth,
each of the plural game terminals of the plural communications group further comprising:
a second return data receiver that receives the second return data; and
a second deallocation identifier that, upon receiving the second return data, identifies bandwidth indicated by the second return data as the badwidth to be deallocated, and wherein the deallocator deallocates bandwidth to be deallocated when the bandwidth to be deallocated is identified.

7. A game system according to claim 1,
wherein the grouper restricts the number of child nodes to the upper limit in a case in which a certain time period has not passed since a first receipt of a grouping request that triggered storage, in the secured amount storage, of the piece of secured amount data stored in the secured amount storage in association with a game terminal that is not yet in the player group, whereas the grouper makes the number of child nodes freely selected within the range if the certain time period has passed.

8. A game system according to claim 2,
wherein the securer, upon receiving the allocation amount data, determines whether bandwidth indicated by the allocation amount data is greater than bandwidth corresponding to the upper limit, and if a result of the determination is affirmative, identifies bandwidth therebetween as the bandwidth to be deallocated and secures bandwidth corresponding to the upper limit.

9. A game system according to claim 2,
wherein the securer, upon receiving the allocation amount data, determines whether bandwidth indicated by the allocation amount data is less than bandwidth corresponding to the lower limit and is greater than the certain amount of bandwidth, and if a result of the determination is affirmative, identifies bandwidth between the bandwidth indicated by the allocation amount data and the certain amount of bandwidth as the bandwidth to be deallocated and secures the certain amount of bandwidth.

10. A game terminal for use in a game system having a server device comprising:
a communicator that communicates with the server device;
an inputter that receives an instruction input by a player;
a securer that secures, upon a predetermined instruction being input via the inputter, bandwidth that is equal to or greater than a certain amount of bandwidth necessary for communication with another of the game terminals and is equal to or less than a remaining amount of the bandwidth of a communication path used for the game terminal;
a grouping request transmitter that transmits a grouping request for requesting formation of the player group of terminals which will play a multiple player game to the server device, the grouping request including a piece of secured amount data indicating the bandwidth secured by the securer;
a player group data receiver that receives player group data indicating the configuration of a player group consisting of a parent node and child nodes, from the server device, wherein the number of child nodes varies for different player groups within a range having an upper limit and a lower limit;
wherein the child nodes of the player group each exclusively use the certain amount of bandwidth for the communication with the parent node of the player group; and
wherein the player group is grouped by the server device by comparing pieces of secured amount data for game terminals, the comparison of the bandwidths being performed among the game terminals of the number that is greater than the number of child nodes to be selected for the player group, and by selecting as the parent node one game terminal corresponding to the piece of secured amount data indicating a bandwidth that is found to be the largest by the comparison;
a controller that controls, on the basis of the player group data, communication during the game;
a deallocation bandwidth identifier that identifies, as bandwidth to be deallocated, the difference between the bandwidth secured by the securer and bandwidth that will be required at the game terminal in the player group having a configuration indicated by the player group data; and
a deallocator that deallocates the bandwidth to be deallocated.

11. A server device for use in a game system having plural communication groups each including plural game terminals, the server device comprising:
a grouping request receiver that receives a grouping request from the game terminals for requesting formation of a player group of terminals which will play a multiple player game, the grouping request also indicating a bandwidth secured by the game terminal transmitting the grouping request;
a secured amount storage that stores a piece of secured amount data indicating the bandwidth indicated by the grouping request in association with the game terminal that has transmitted the grouping request;
a grouper that forms the player group based on the pieces of secured amount data stored in the secured amount storage by selecting one of the game terminals stored in the secured amount storage as a parent node and a number of game terminals stored in the secured amount storage as child nodes, wherein the number of child nodes varies for different player groups within a range having an upper limit and a lower limit, wherein the grouper compares bandwidths indicated by the pieces of secured amount data for game terminals, the comparison of the bandwidths being performed among the game terminals of the number that is greater than the number of child nodes to be selected for the player group, and selects as the parent node one game terminal of secured amount data indicating a bandwidth that is found to be the largest by the comparison; and a player group data transmitter that transmits the player group data of the player group to each of the game terminals that are selected through the selection by the grouper, the player group data indicating the configuration of the player.

* * * * *